(12) United States Patent
Makino et al.

(10) Patent No.: US 8,338,042 B2
(45) Date of Patent: Dec. 25, 2012

(54) FUEL CELL SYSTEM

(75) Inventors: Shinichi Makino, Yokosuka (JP);
Masatoshi Iio, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1159 days.

(21) Appl. No.: 12/095,855

(22) PCT Filed: Dec. 27, 2006

(86) PCT No.: PCT/IB2006/004310
§ 371 (c)(1), (2), (4) Date: Jul. 11, 2008

(87) PCT Pub. No.: WO2008/093147
PCT Pub. Date: Aug. 7, 2008

(65) Prior Publication Data
US 2010/0221624 A1    Sep. 2, 2010

(51) Int. Cl.
*H01M 8/04* (2006.01)
(52) U.S. Cl. .................................................... 429/429
(58) Field of Classification Search .............. 429/429, 429/443
See application file for complete search history.

(56) References Cited

U.S. PATENT DOCUMENTS

| | | | |
|---|---|---|---|
| 4,755,439 A * | 7/1988 | Trocciola et al. | 429/415 |
| 2002/0182456 A1* | 12/2002 | Condit et al. | 429/13 |
| 2004/0067399 A1* | 4/2004 | Kobayashi et al. | 429/25 |
| 2005/0271918 A1* | 12/2005 | Murakami et al. | 429/22 |

FOREIGN PATENT DOCUMENTS

| | | |
|---|---|---|
| JP | 2004-139984 A | 5/2004 |
| JP | 2005-515603 | 5/2005 |
| JP | 2005-166424 | 6/2005 |
| JP | 2005-190854 | 7/2005 |
| JP | 2005-203143 | 7/2005 |
| JP | 2005-203222 | 7/2005 |
| JP | 2005-251411 | 9/2005 |

* cited by examiner

*Primary Examiner* — Maria J Laios
(74) *Attorney, Agent, or Firm* — Young Basile

(57) ABSTRACT

A fuel cell system includes a controller that estimates or detects an air replacement state of a fuel electrode and a hydrogen circulation path while the operation of the fuel cell system is stopped. Upon starting the fuel cell system, the controller changes the order in which the operation of a hydrogen circulation pump is started and a hydrogen pressure regulator is opened to start the supply of hydrogen gas on the basis of the estimated or detected air replacement state, thereby preventing deterioration caused by uneven distribution of air and hydrogen in the fuel electrode.

26 Claims, 18 Drawing Sheets

FUEL CELL SYSTEM

CROSS-REFERENCES TO RELATED APPLICATION

This application claims priority from Japanese Patent Application Serial No. 2005-349703 filed Dec. 2, 2005, the content of which is incorporated herein by reference in its entirety.

TECHNICAL FIELD

The present invention relates to a proton exchange membrane fuel cell system.

BACKGROUND

In general, if hydrogen and oxygen are unevenly distributed in a fuel electrode of a fuel cell when the fuel cell is started, a local potential is generated in a region where a hydrogen concentration is relatively high and serves to cause a current flow in a direction opposite to that in a normal power-generating state in a region where an oxygen concentration is relatively high. Therefore, an oxidizer electrode, in particular, quickly deteriorates. In order to solve this problem, an invention for discharging oxygen that remains in the fuel electrode and replacing the oxygen with hydrogen gas in a short time is disclosed in, for example, Japanese Unexamined Patent Application Publication No. 2004-139984 (see page 12 and FIG. 14). According to this invention, when a fuel cell is started, a control value of a secondary pressure regulator is set to be higher than a supply pressure in a normal power-generating state and hydrogen is supplied to the fuel cell by opening a hydrogen supply solenoid valve while driving a hydrogen pump.

SUMMARY

However, according to the start method disclosed in the above-mentioned publication in which the hydrogen pump is started first, even when the fuel electrode of the fuel cell is filled with air (or hydrogen), if the gas composition in the fuel electrode and a hydrogen circulation path is uneven, hydrogen (or air) that remains in the hydrogen circulation path flows into the fuel electrode immediately after the operation of the hydrogen pump is started. In addition, it requires a relatively long time for the hydrogen circulation pump to accelerate to a predetermined rotational speed after the hydrogen circulation pump is started. Therefore, it takes a relatively long time to eliminate the uneven distribution of hydrogen and oxygen in the fuel electrode. Accordingly, deterioration of the fuel cell progresses.

In order to solve the above-described problem, a fuel cell system according to one aspect of the present invention includes an air-replacement-state recognizing unit for estimating or detecting a state in which hydrogen and air are unevenly distributed in at least one of a fuel electrode, and a fuel-gas circulation path and a start control device for operating the fuel-gas circulation pump after supplying the fuel gas upon starting the fuel cell if the air-replacement-state recognizing unit estimates or detects that hydrogen and air are unevenly distributed.

According to the present invention, the timings of activation of the fuel-gas circulation pump and the supply of fuel gas are changed on the basis of the air replacement state. As a result, deterioration of the fuel cell caused by uneven distribution of the fuel gas and air in the fuel electrode caused by air infiltration into the fuel chamber (the fuel electrode, the fuel-gas circulation path, and fuel-gas circulating means) is prevented.

DETAILED DESCRIPTION

Next, embodiments of the present invention will be described in detail with reference to the drawings.

Figure 1:
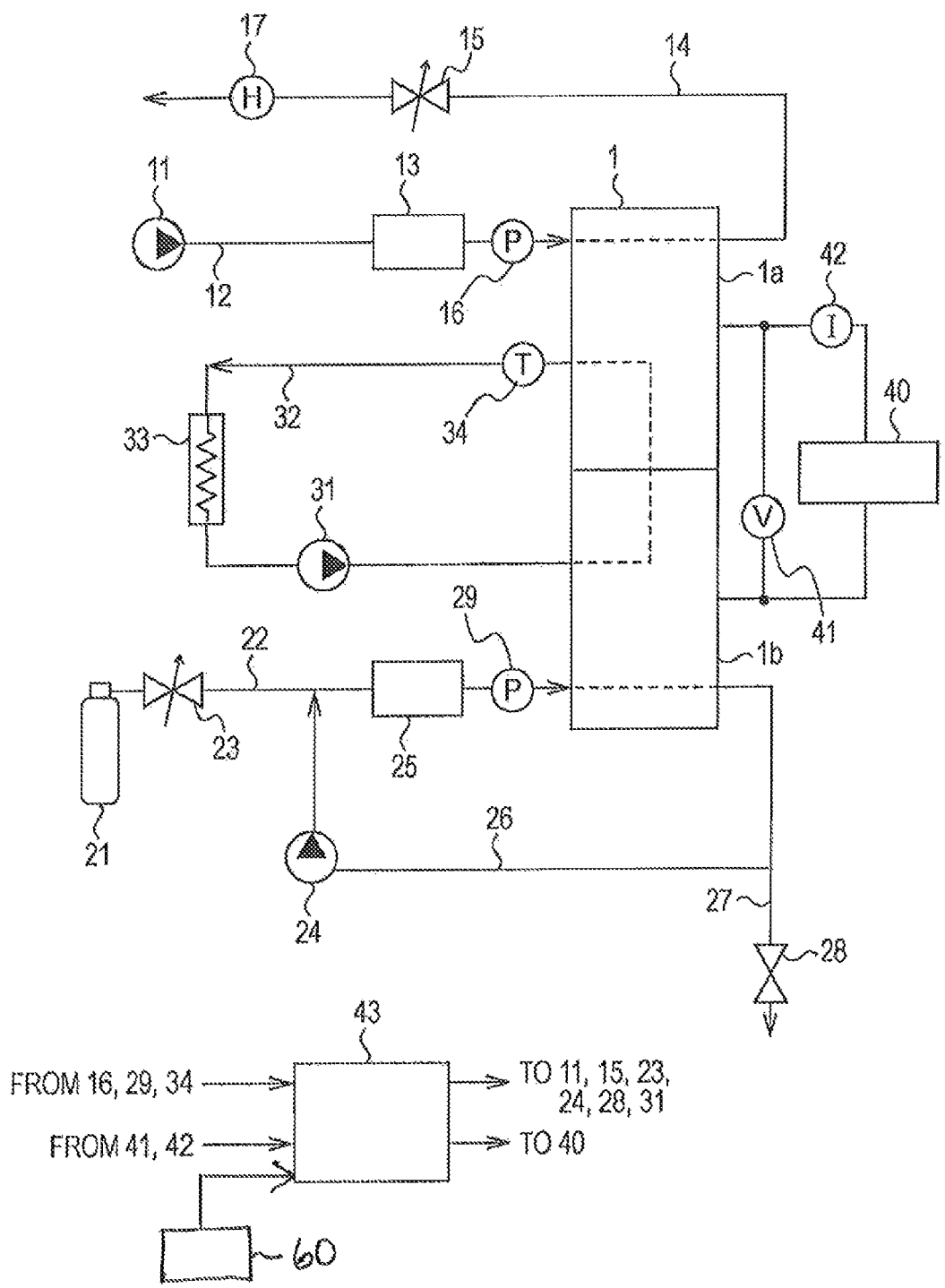
FIG. 1 is a diagram illustrating a fuel cell system.

First, the overall structure of a fuel cell system to which the present invention may be applied will be described below with reference to FIG. 1, which is a diagram illustrating the fuel cell system and FIG. 2, which is a diagram illustrating a single cell in a fuel cell.

Fuel Cell Body

Figure 2:
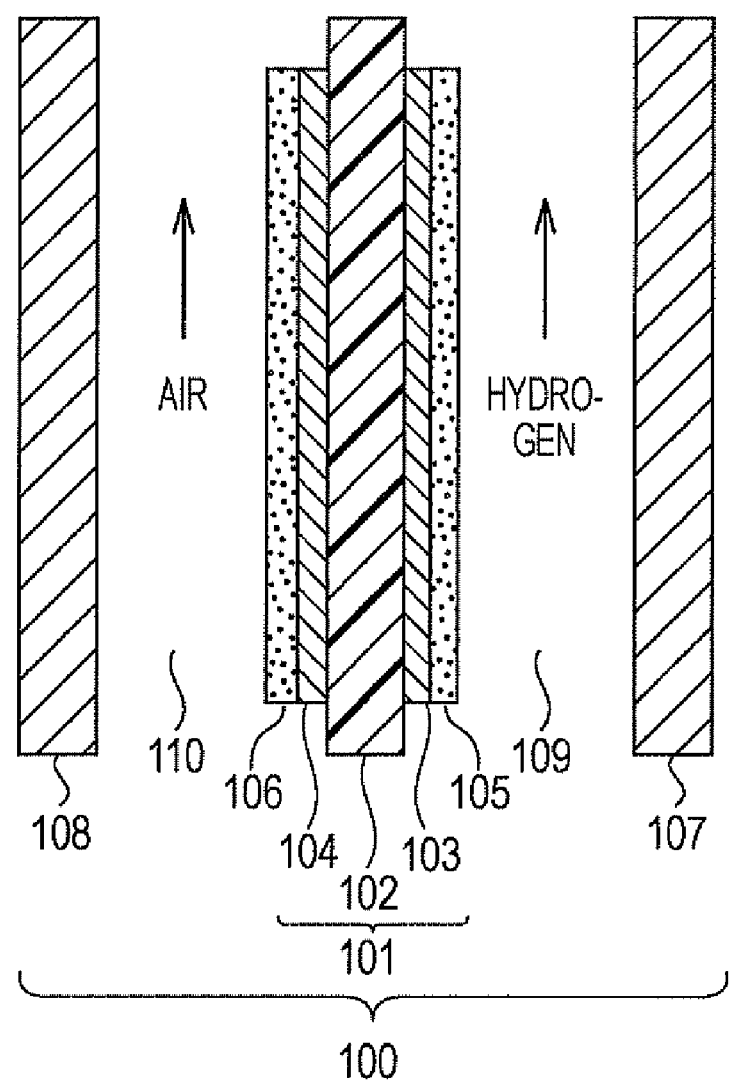
FIG. 2 is a diagram illustrating a single cell in a fuel cell.

As shown in FIG. 2, a single cell 100 of a fuel cell includes a membrane-electrode assembly (MEA) 101. The MEA 101 includes a solid polymer electrolyte membrane 102, a fuel-electrode catalyst layer 103 provided on one side of the electrolyte membrane 102, and an oxidizer-electrode catalyst layer 104 provided on the other side of the electrolyte membrane 102. The single cell 100 further includes a fuel-gas diffusion layer 105 provided on one side of the MEA 101, an oxidizing-gas diffusion layer 106 provided on the other side of the MEA 101, and separators 107 and 108.

A fuel-gas path 109 is provided between the separator 107 and the fuel-gas diffusion layer 105. An oxidizing-gas path 110 is provided between the separator 108 and the oxidizing-gas diffusion layer 106. The fuel cell body includes a plurality of cells similar to the single cell 100. Fuel gas (hydrogen) and oxidizing gas (air) are externally supplied to the fuel cell body and are caused to flow through the fuel-gas path 109 and the oxidizing-gas path 110, respectively, so that electric power is generated as a result of electrochemical reaction.

A fuel cell system to which the present invention may be applied includes a fuel cell body 1, an air system for supplying air, a hydrogen system for supplying hydrogen, a cooling water system for supplying cooling water, and a load system for extracting the electric power from the fuel cell body 1.

Air System

The air system includes an air compressor 11 for sucking in and compressing air, an air-system humidifier 13 for humidifying the air compressed by the air compressor 11 and supplying the humidified air to an oxidizer electrode $1a$, an air pressure gage 16 for detecting the pressure of the air supplied to the oxidizer electrode $1a$, and an air pressure regulator 15 for adjusting the pressure in the oxidizer electrode $1a$ by regulating the air discharged from the oxidizer electrode $1a$.

The air compressed by the air compressor 11 is supplied through the air supply path 12 to the air-system humidifier 13 and is humidified. Then, the humidified air is supplied to the oxidizer electrode $1a$ of the fuel cell body 1 and is consumed by the electrochemical reaction in the fuel cell body 1. Then, the exhaust air is caused to flow through the air discharge path 14 and is discharged from the system after the pressure adjustment is performed by the air pressure regulator 15. The pressure of the air supplied to the oxidizer electrode $1a$ is detected by the air pressure gage 16 disposed at an inlet of the oxidizer electrode $1a$, and the air pressure regulator 15 is controlled such that the detected pressure becomes equal to a desired pressure. The air-system humidifier 13 may include a water vapor exchange membrane for utilizing moisture included in the exhaust or may use pure water that is externally supplied.

A hydrogen detector 17 for detecting hydrogen included in the exhaust air is disposed downstream of the air pressure regulator 15. Accordingly, hydrogen that enters through the electrolyte membrane 102 from a fuel electrode $1b$ to the oxidizer electrode $1a$ and hydrogen that leaks from a sealed portion can be detected.

Hydrogen System

The hydrogen system includes a high-pressure hydrogen tank 21 that stores hydrogen gas, a hydrogen pressure regulator 23 for adjusting the pressure of the hydrogen, a hydrogen-system humidifier 25 for humidifying the hydrogen after the pressure thereof is adjusted and supplying the humidified hydrogen to the fuel electrode $1b$, a hydrogen pressure gage 29 for detecting the pressure of the hydrogen supplied to the fuel electrode $1b$, a hydrogen circulation pump 24 and a hydrogen circulation path 26 for circulating the hydrogen discharged from an outlet of the fuel electrode $1b$ to an inlet of the fuel electrode $1b$, and a hydrogen discharge path 27 and a hydrogen discharge valve 28 for discharging impurities accumulated in the fuel electrode $1b$ and the hydrogen circulation path 26 from the system.

The hydrogen supplied from the high-pressure hydrogen tank 21 flows through the hydrogen supply path 22 via the hydrogen pressure regulator 23, where the pressure of the hydrogen is adjusted to a desire pressure, and joins the discharge hydrogen circulated by the hydrogen circulation pump 24. Then, the hydrogen is humidified by the hydrogen-system humidifier 25 and is fed to the fuel electrode $1b$ of the fuel cell body 1. The pressure of the hydrogen supplied to the fuel electrode $1b$ is detected by the hydrogen pressure gage 29 provided at the inlet of the fuel electrode $1b$, and the hydrogen pressure regulator 23 is controlled such that the detected pressure becomes equal to the desired pressure. After the hydrogen is consumed by the electrochemical reaction in the fuel cell body 1, the excess hydrogen is caused to pass through the hydrogen circulation path 26 by the hydrogen circulation pump 24 and is used for power generation again.

On the other hand, nitrogen that enters from the oxidizer electrode $1a$ to the fuel electrode $1b$ during the operation and impurities included in the high-pressure hydrogen tank 21 accumulate in the hydrogen system. Therefore, these impurities are discharged from the system through the hydrogen discharge path 27 by opening the hydrogen discharge valve 28.

Cooling Water System

The cooling water system is provided to maintain the temperature of the fuel cell body 1 at an adequate temperature by removing heat generated as a result of power generation performed by the fuel cell body 1. The cooling water system includes a cooling water pump 31 for circulating the cooling water, a cooling water circulation path 32, a heat exchanger 33 for dissipating heat to the outside of the system, and a cooling water thermometer 34 for detecting the temperature of the cooling water at a position near a cooling-water outlet of the fuel cell body 1.

The cooling water is pressurized by the cooling water pump 31 so as to flow through the fuel cell body 1, and thereby absorbs heat. Then, the cooling water flows through the cooling water circulation path 32 to the heat exchanger 33, where the heat is discharged to the outside of the system. Then, the cooling water is caused to flow through the fuel cell body 1 again by the cooling water pump 31. The temperature of the cooling water is monitored by the cooling water thermometer 34 and is adjusted to a temperature appropriate for the power generation level provided by the fuel cell body by controlling the amount of air flow supplied to the heat exchanger 33 by a blower.

Load System

A load device 40 that absorbs the electric power generated by the fuel cell body 1 functions as, for example, an inverter for supplying electric power to a vehicle drive motor in a fuel cell vehicle. A power generation voltage of the fuel cell body 1 is detected by a voltmeter 41, and a current supplied to the load device 40 from the fuel cell body 1 is detected by an ammeter 42.

Control System

A controller 43 operates as a start control device to control the overall operation of the fuel cell system including the fuel cell body 1. The controller 43 includes, for example, a central processing unit (CPU), a read only memory (ROM) that stores control programs and control parameters, a working random access memory (RAM), and a microprocessor including an input/output interface.

The controller 43 outputs control signals to the air compressor 11, the air pressure regulator 15, the hydrogen pressure regulator 23, the hydrogen circulation pump 24, the hydrogen discharge valve 28, the cooling water pump 31, and the load device 40 on the basis of detected signals obtained from the air pressure gage 16, the hydrogen pressure gage 29, the cooling water thermometer 34, the voltmeter 41, and the ammeter 42 in order to adjust the pressure, temperature, the amount of flow, and the load in the fuel cell body 1.

Figure 3:
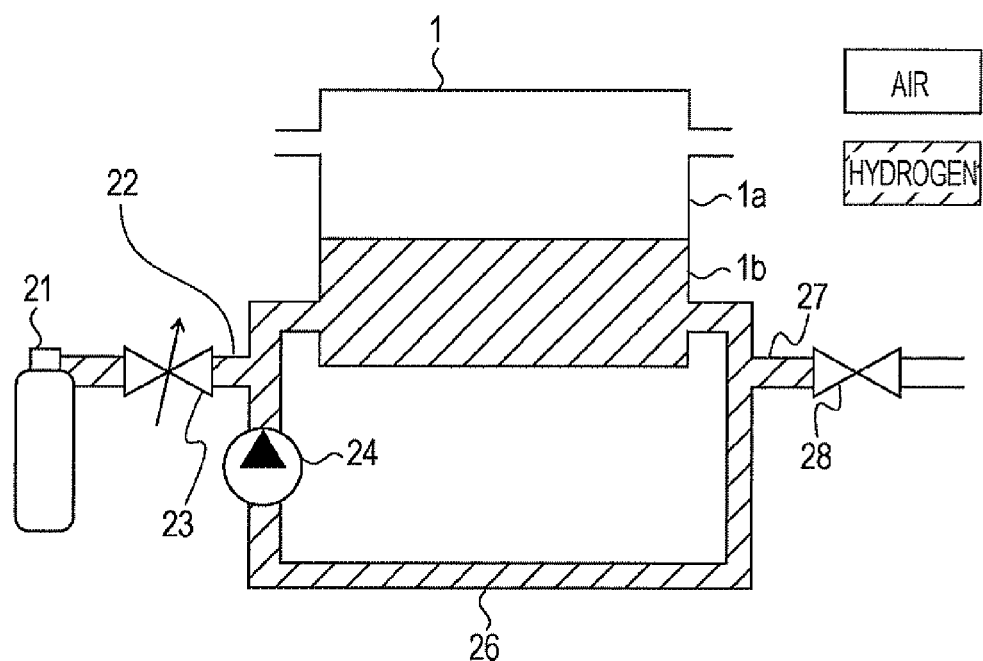
FIG. 3 is a diagram illustrating an inner state (state A) of a fuel chamber.

Next, the state of the fuel chamber (the hydrogen supply path 22, the hydrogen circulation pump 24, the hydrogen-system humidifier 25, the fuel electrode 1b, and the hydrogen circulation path 26) that varies in a period from when the fuel cell system stops to when the fuel cell system is restarted will be described with reference to FIGS. 3, 4, and 5. In the figures, the hydrogen-system humidifier 25 is omitted.

A. Immediately after Stoppage

In a period immediately after the stoppage, the fuel chamber is in State A, wherein the fuel chamber is filled with hydrogen provided before the power generation was stopped. This can be seen in FIG. 3.

B. After an Extended Time from Stoppage (or when Air Replacement Occurs)

Figure 4:
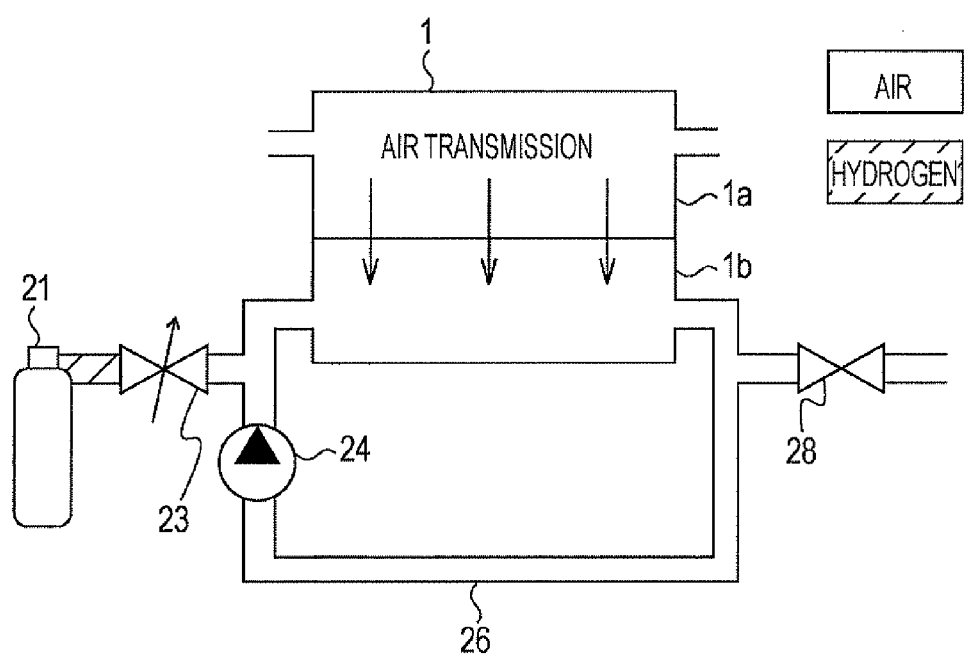
FIG. 4 is a diagram illustrating another inner state (state B) of the fuel chamber.

After a sufficient time from the stoppage, the fuel chamber is in State B shown in FIG. 4, wherein air leaks or otherwise enter through the MEA 101 from the oxidizer electrode 1a to the fuel electrode 1b and diffuse into the fuel chamber so that the fuel chamber becomes filled with the air. The amount of the original hydrogen that has been replaced by the infiltrated air is referred to herein as the air replacement state. The time required for the air to fill the fuel chamber varies in accordance with the material, the thickness, the temperature, etc., of the MEA 101, but is generally about several hours.

C. Several Minutes to Several Tens of Minutes after Stoppage

Figure 5:
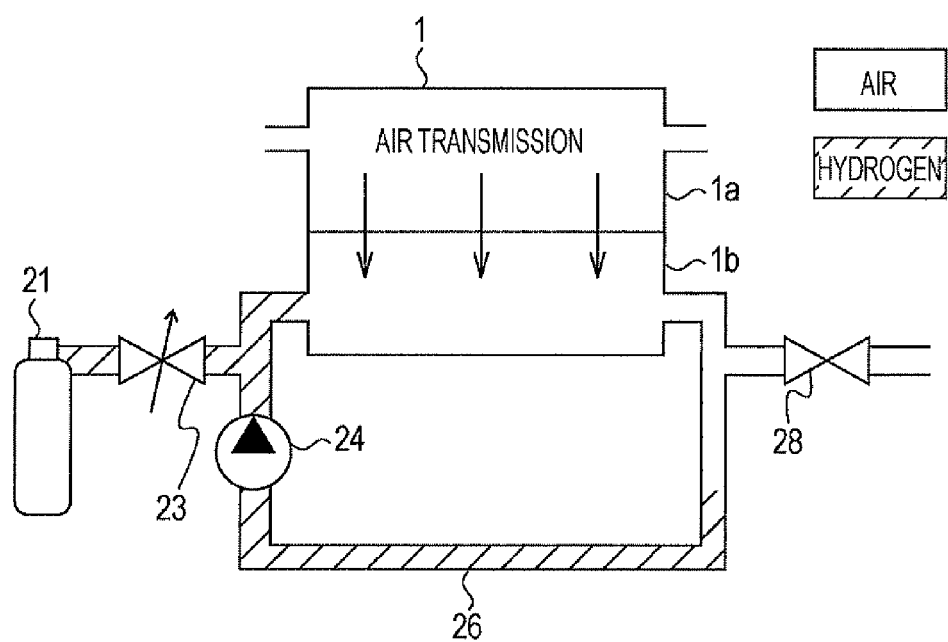
FIG. 5 is a diagram illustrating another inner state (state C) of the fuel chamber.

In a relatively short time period after the stoppage, referred to as State C of the fuel chamber, air diffuses into the fuel electrode 1b while other portions of the fuel chamber (the hydrogen circulation pump 24, the hydrogen-system humidifier 25, and the hydrogen circulation path 26) remain filled with hydrogen that was provided during the previous operation of power generation (see FIG. 5). Therefore, in contrast to state B, the air and hydrogen are unevenly distributed in the fuel chamber. The time period and rate at which the hydrogen is replaced with air varies in accordance with the material, the thickness, the temperature, etc., of the MEA 101, but is generally about several minutes to several tens of minutes. Here, the uneven distribution refers to the state in which hydrogen and oxygen (or gases having different hydrogen densities) exist separately within the fuel chamber.

First Embodiment

Next, a fuel cell system according to a first embodiment of the present invention will be described below. The structure of the fuel cell system according to the first embodiment is similar to that shown in FIG. 1. However, the controller 43 includes an air-replacement-state estimator for estimating an air replacement state of the fuel electrode 1b and the hydrogen circulation path 26 when the fuel cell system is stopped. When the fuel cell system is started, the controller 43 controls the timings at which the operation of the hydrogen circulation pump 24 is started and the hydrogen pressure regulator 23 is opened to start supplying the fuel gas on the basis of the estimated air replacement state.

Start Method for First Embodiment

Figure 6:
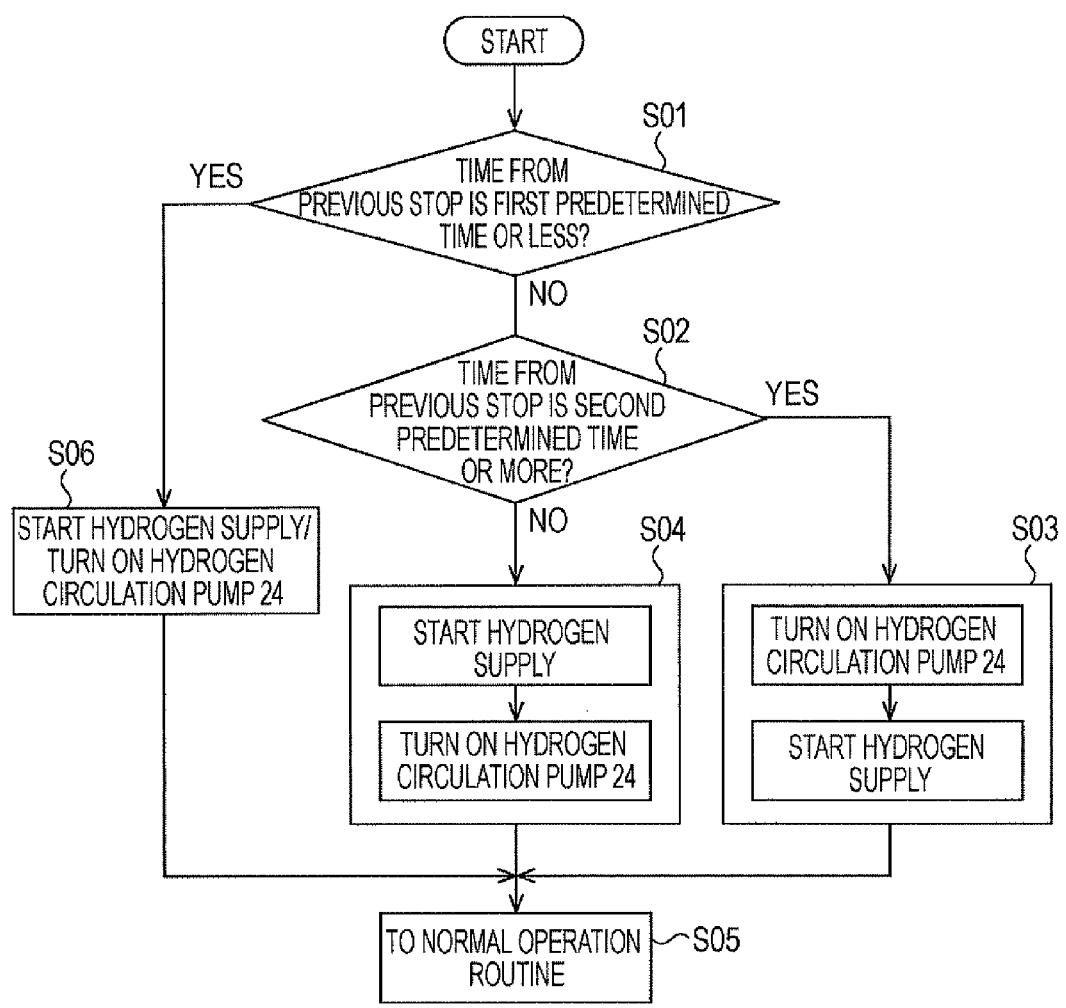
FIG. 6 is a flowchart of a process performed in a fuel cell system according to a first embodiment of the present invention.

Next, a method for starting the fuel cell system according to the present embodiment will be described below with reference to a flowchart shown in FIG. 6. When, for example, the state of a key switch is changed from Off to On, the controller 43 detects the change and follows the steps of the flowchart of FIG. 6 to start the fuel cell system.

First, in Step 01 ('Step' is hereafter abbreviated as 'S'), it is determined whether or not a time elapsed after the previous stoppage is within a first predetermined time by referring to an air replacement state recognizing means (e.g., a timer 60).

If it is determined that the elapsed time is equal to or less than the first predetermined time in S01, that is, if the result of the determination of S01 is Yes, it is determined that the fuel chamber is filled with hydrogen provided in the previous operation of power generation (state A). Accordingly, it is determined that hydrogen and oxygen are not unevenly distributed in the fuel electrode 1b, and the deterioration will not progress during start up. Therefore, the process proceeds to S06, where the supply of hydrogen is started and the hydrogen circulation pump 24 is activated. Here, the order in which the supply of hydrogen is started and the hydrogen circulation pump 24 is activated is not restricted. Accordingly, the supply of hydrogen may be started and the hydrogen circulation pump 24 may be activated at the same time. Then, the process proceeds to S05, where a normal operation routine is performed. The normal operation routine is a control routine for performing a normal operation. More specifically, in the normal operation, the air system, the hydrogen system, the cooling system, the load system, and the control system are operated in accordance with the load requirement of the system. Here, the uneven distribution refers to the state in which hydrogen and oxygen (or gases having different hydrogen densities) exist separately.

If it is determined that the elapsed time is more than the first predetermined time in S01, that is, if the result of the determination of S01 is No, the process proceeds to S02, where it is determined whether or not the time elapsed after the previous stoppage is equal to or more than a second predetermined time by referring to the timer.

If it is determined that the elapsed time is equal to or more than the second predetermined time in S02, that is, if the result of the determination of S02 is Yes, it is determined that the fuel chamber is filled with air from the oxidizer electrode 1a during the stoppage (state B) and the process proceeds to S03. In S03, first, the hydrogen circulation pump 24 is activated to generate a negative pressure at the outlet of (and gas flow through) the fuel electrode 1b, and then the supply of hydrogen gas is started by executing a hydrogen supply start routine. Therefore, the time period in which hydrogen and oxygen are unevenly distributed in the fuel electrode 1b is reduced, and the deterioration is reduced. Then, the process proceeds to S05, where the normal operation routine is performed.

If it is determined that the elapsed time is less than the second predetermined time in S02, that is, if the result of the determination of S02 is No, it is determined that hydrogen that remains after the previous stoppage of power generation and air that enters from the oxidizer electrode 1a are unevenly distributed in the fuel chamber (state C), and the process proceeds to S04. In S04, first, the supply of hydrogen gas is started, and then the hydrogen circulation pump 24 is started. Therefore, the uneven distribution of hydrogen and oxygen in the fuel electrode 1b, which would otherwise occur under prior art methods immediately after the hydrogen circulation pump is activated, can be avoided, and the deterioration can be prevented from progressing. The process then proceeds to S05, where the normal operation routine is performed.

The above-described embodiment provides the following effects:

(1) If it is determined that the fuel electrode 1b is filled with hydrogen (state A), then the normal power generating operation can be started immediately. Therefore, the start time can be reduced.

(2) If it is determined that fuel electrode 1b is substantially filled with air (state B), then high-pressure hydrogen can be supplied and drawn through the fuel electrode 1b in response to a negative pressure generated in the fuel electrode 1b by the hydrogen circulation pump 24. Therefore, the time period during which hydrogen and oxygen are unevenly distributed in the fuel electrode 1b can be reduced, and the deterioration of the fuel cell can be suppressed.

(3) If it is determined that hydrogen that remains after the previous stoppage of power generation and air that enters from the oxidizer electrode 1a are unevenly distributed in the fuel chamber (state C), then the hydrogen circulation pump 24 is started after the supply of hydrogen gas is started. Therefore, the uneven distribution of hydrogen and oxygen in the fuel electrode 1b, which would otherwise occur using prior art methods immediately after the hydrogen circulation pump is operated, can be avoided, and the deterioration of the fuel cell can be prevented from progressing.

Estimation of the Air Replacement State

Next, the first and second predetermined times for determining the mixed air state of the fuel chamber on the basis of the time elapsed after the previous stoppage until the restart will be described below. To determine these times, an oxygen concentration sensor or a hydrogen concentration sensor is disposed at a certain position in the fuel chamber of an experimental fuel cell system and a variation with time in the concentration of oxygen or hydrogen after the fuel cell system is stopped is experimentally measured. Then, the first predetermined time is determined as a time period during which the oxygen concentration is equal to or less than a predetermined value (the hydrogen concentration is equal to or more than a predetermined value) and at which the deterioration does not progress even when the normal operation routine is started in the fuel chamber immediately after the fuel cell system is started.

The second predetermined time is based upon temperature and is determined as a time period required for the oxygen concentration to become equal to or more than a predetermined value (for the hydrogen concentration to become equal to or less than a predetermined value) at which the deterioration of the fuel electrode 1b does not progress even when the hydrogen circulation pump 24 is operated first in the fuel chamber.

Figure 7:
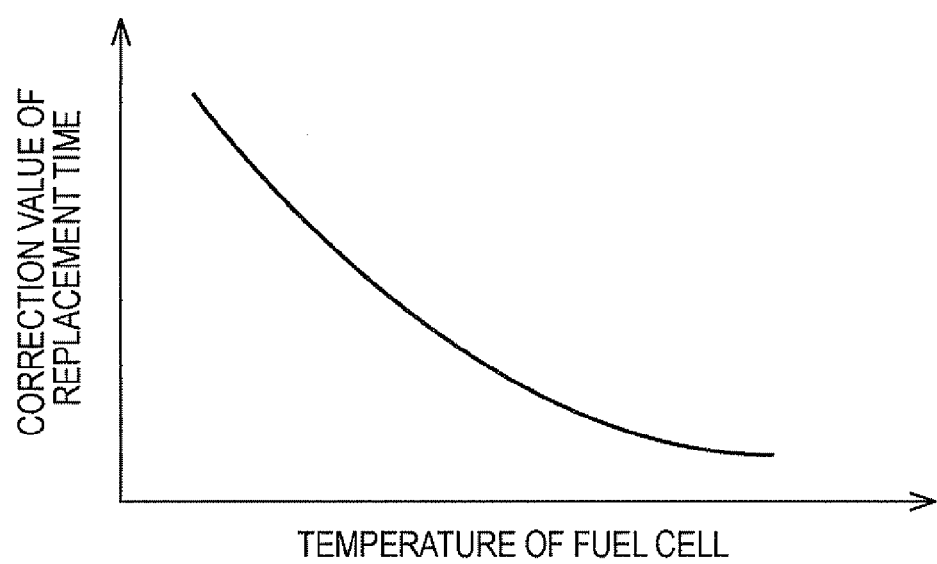
FIG. 7 is a diagram illustrating the fuel cell system according to the first embodiment of the present invention.

The time rate at which the air enters from the oxidizer electrode 1a to the fuel electrode 1b depends on the temperature of the fuel cell body 1, and the transmission speed is increased as the temperature is increased. Therefore, an experiment of, for example, varying the fuel cell temperature detected by the cooling water thermometer 34 and measuring the variation with time in gas concentration in the fuel chamber is performed, and a correction value (correction coefficient), as shown in FIG. 7, is determined and stored in the controller in advance. The first and second predetermined times are multiplied by the correction value so that first and second predetermined times can be used as more accurate determination thresholds.

Second Embodiment

Figure 8:
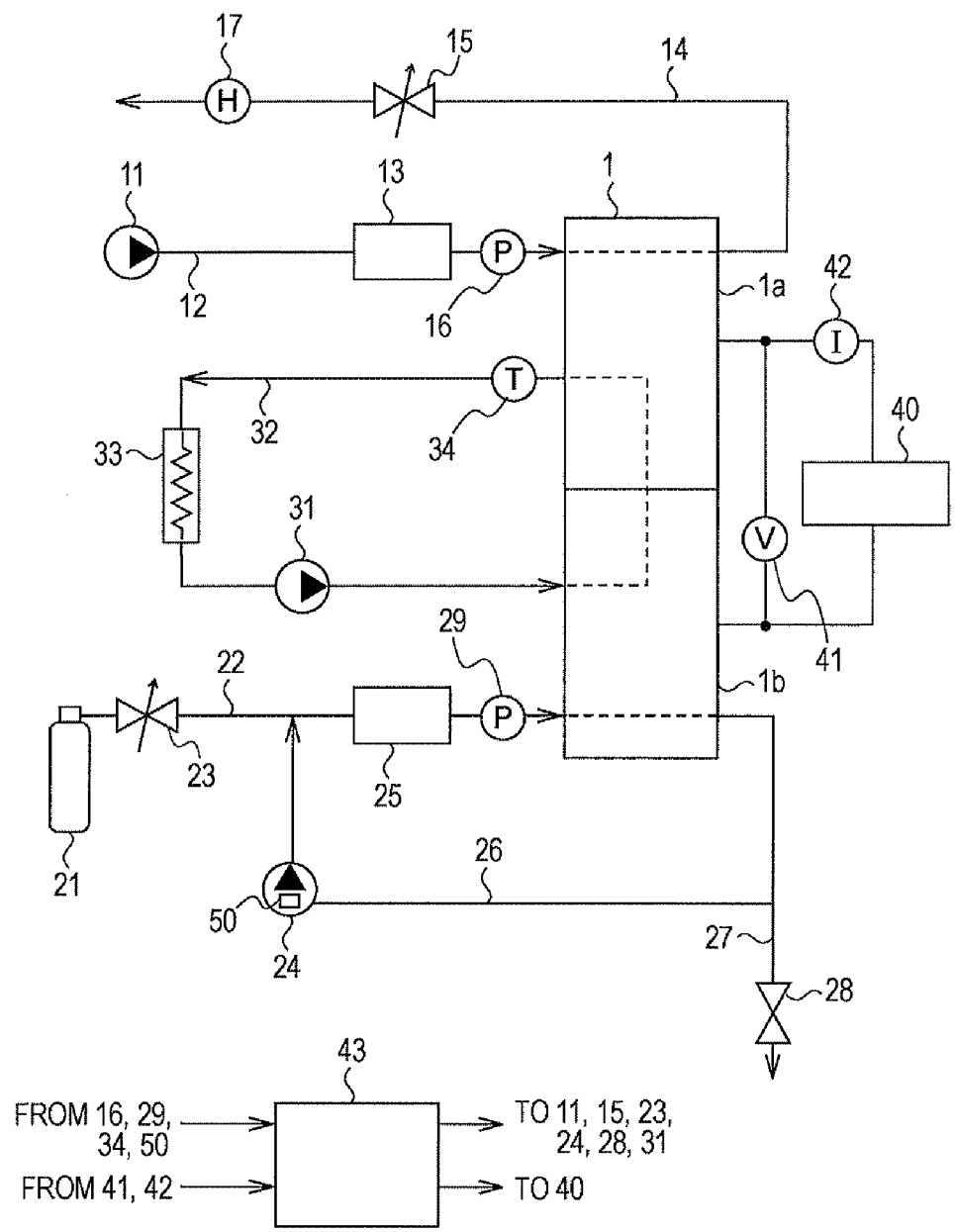
FIG. 8 is a diagram illustrating a fuel cell system according to a second embodiment of the present invention.

A fuel cell system according to a second illustrated embodiment of the present invention will be described below. FIG. 8 is a system diagram showing the structure according to the second embodiment. The structure according to the second embodiment is similar to that shown in FIG. 1 except that an oxygen concentration meter 50 for measuring the oxygen concentration in the hydrogen circulation pump 24 is provided as an air replacement state recognizing means.

Start Method

Figure 9:
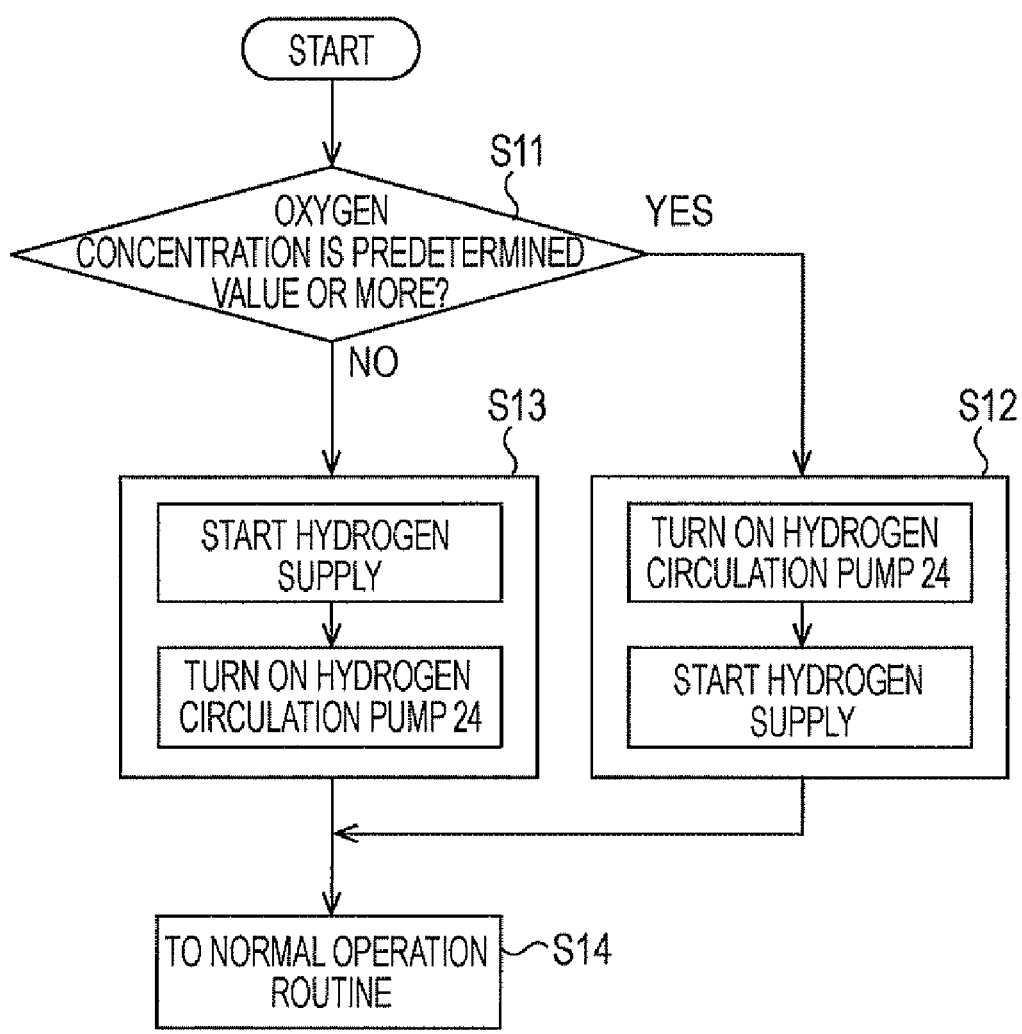
FIG. 9 is a flowchart of a process performed in the fuel cell system according to the second embodiment of the present invention.

A method for starting the fuel cell system according to the second embodiment will be described below with reference to a flowchart shown in FIG. 9. When, for example, the state of a key switch is changed from Off to On, the controller 43 detects the change and follows the steps of the flowchart of FIG. 9 to start the fuel cell system.

First, in S11, a detection value of the oxygen concentration meter 50 is read and it is determined whether or not the oxygen concentration in the hydrogen circulation pump 24 is equal to or more than a predetermined value. If it is determined that the oxygen concentration is equal to or more than the predetermined value in S11, that is, if the result of the determination of S11 is Yes, it is determined that the fuel chamber is filled with air transmitted from the oxidizer electrode 1a during the stoppage (state B) and the process proceeds to S12. In S12, first, the hydrogen circulation pump 24 is started to generate a negative pressure at the outlet of (and gas flow through) the fuel electrode 1b, and then the supply of fuel gas is started. Therefore, the time period in which hydrogen and oxygen are unevenly distributed in the fuel electrode 1b is reduced, and the deterioration is suppressed. The process then proceeds to S14, where the normal operation routine is performed.

If is determined that the oxygen concentration is less than the predetermined value in S11, that is, if the result of the determination of S11 is No, it is determined that hydrogen that remains after the previous stoppage of power generation and air that enters from the oxidizer electrode 1a are unevenly distributed in the fuel chamber (state C) or that the fuel chamber is filled with hydrogen provided before the previous stoppage of power generation (state A), and the process proceeds to S13.

In S13, first, the supply of hydrogen gas is started, and then the operation of the hydrogen circulation pump 24 is started. Therefore, the uneven distribution of hydrogen and oxygen in the fuel electrode 1b, which would otherwise occur under prior methods immediately after the hydrogen circulation pump is started, can be avoided and the deterioration of the fuel cell can be prevented from progressing. Then, the process proceeds to S14, where the normal operation routine is performed.

The above-described embodiment provides the following effects:

(1) If it is determined that fuel electrode 1b is filled with air (state B), high-pressure hydrogen can be supplied after a negative pressure is generated in and gas flow resumes through the fuel electrode 1b by operation of the hydrogen circulation pump 24. Therefore, the time period during which hydrogen and oxygen are unevenly distributed in the fuel electrode 1b can be reduced, and the deterioration of the fuel cell can be suppressed.

(2) If it is determined that hydrogen provided in the previous operation of power generation and air that enters from the oxidizer electrode 1a are unevenly distributed in the fuel chamber (state C) or that the fuel chamber 1b is filled with hydrogen (state A), the operation of the hydrogen circulation pump 24 is started after the supply of hydrogen gas is started. Therefore, the uneven distribution of hydrogen and oxygen in the fuel electrode 1b, which would otherwise occur using prior methods immediately after the hydrogen circulation pump is operated, can be avoided, and the deterioration of the fuel cell can be prevented from progressing.

State A and state C can be divided from each other on the basis of the time elapsed after the stoppage, as described in the first embodiment. Therefore, the start time may, of course, be reduced by immediately performing the normal operation routine if it is determined that the fuel chamber is in state A.

Predetermined Value of Oxygen Concentration

The predetermined value used for the determination performed in S11 is obtained in advance by experiment and is set to an oxygen concentration at which the deterioration of the fuel electrode 1b does not progress even when the hydrogen circulation pump 24 is operated first in the fuel chamber.

Oxygen Concentration Meter Location

In the hydrogen circulation pump 24, a gap between a casing and a rotor is set to be sufficiently small so as to prevent an internal leakage from an outlet to an inlet during operation. Therefore, the hydrogen circulation pump 24 cannot be easily filled with air compared to other portions after stopping and is last to be filled with air in the hydrogen circulation system via diffusion. Thus, the oxygen concentration meter 50 is disposed in the hydrogen circulation pump 24.

Third Embodiment

Figure 10:
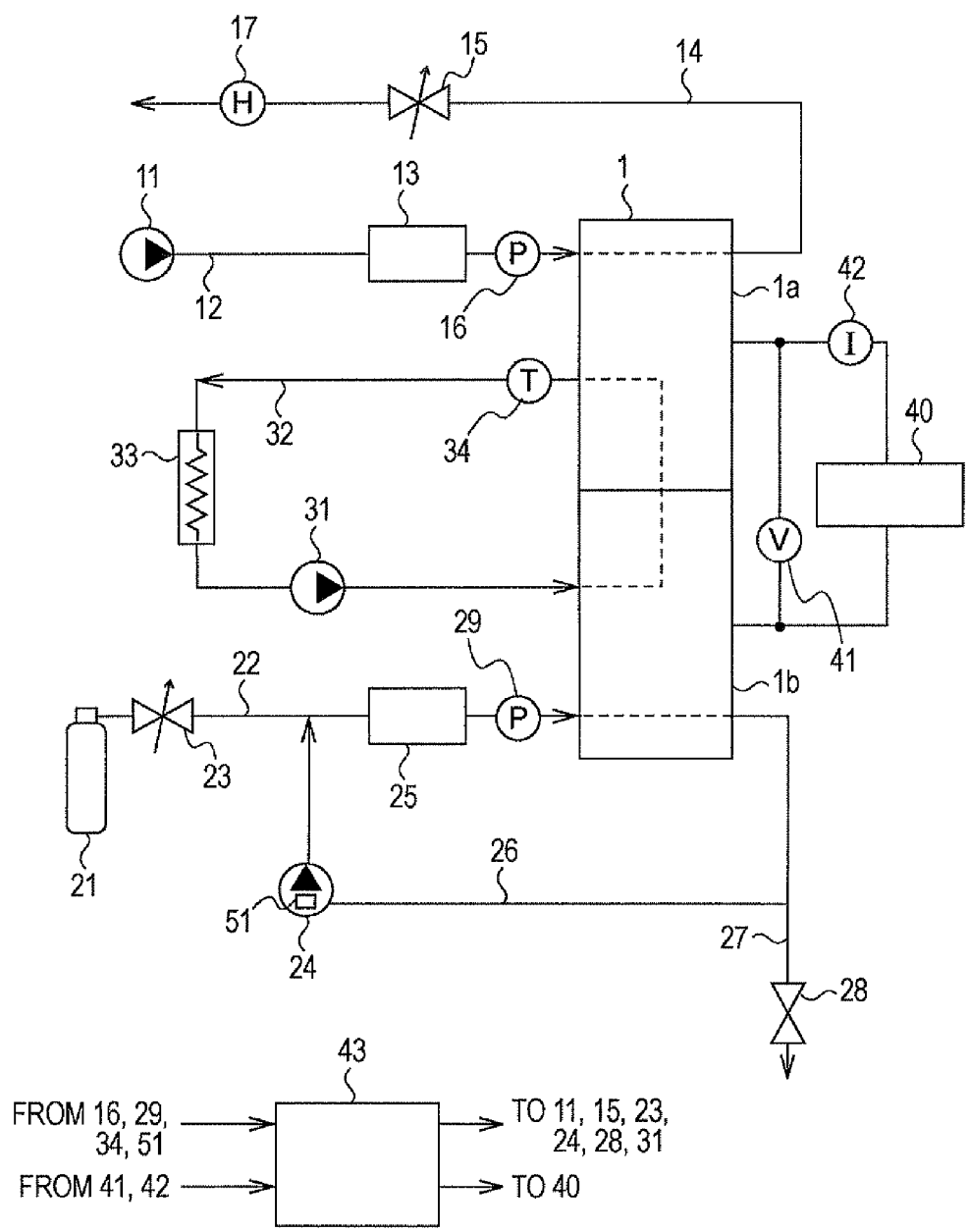
FIG. 10 is a diagram illustrating a fuel cell system according to a third embodiment of the present invention.

A fuel cell system according to a third illustrated embodiment of the present invention will be described below. FIG. 10 is a system diagram showing the structure according to the third embodiment. The structure according to the third embodiment is similar to that shown in FIG. 1 except a hydrogen concentration meter 51 for measuring the hydrogen concentration in the hydrogen circulation pump 24 is provided as an air replacement state recognizing means.

Start Method

Figure 11:
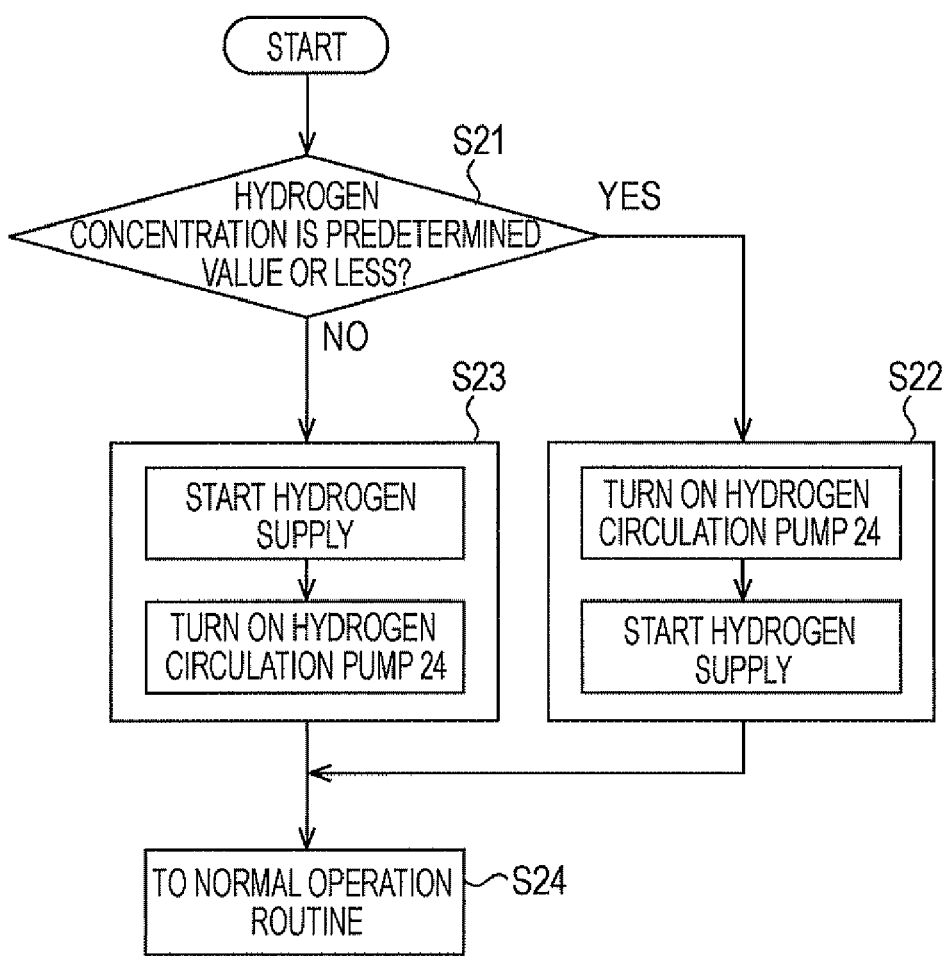
FIG. 11 is a flowchart of a process performed in the fuel cell system according to the third embodiment of the present invention.

A method for starting the fuel cell system according to the third embodiment will be described below with reference to a flowchart shown in FIG. 11. When, for example, the state of a key switch is changed from Off to On, the controller 43 detects the change and follows the steps of the flowchart of FIG. 11 to start the fuel cell system.

First, in S21, a detection value of the hydrogen concentration meter 51 is read and it is determined whether or not the hydrogen concentration in the hydrogen circulation pump 24 is equal to or less than a predetermined value. If it is determined that the hydrogen concentration is equal to or less than the predetermined value in S21, that is, if the result of the determination of S21 is Yes, it is determined that the fuel chamber is filled with air transmitted from the oxidizer electrode 1a during the stoppage (state B) and the process proceeds to S22. In S22, first, the hydrogen circulation pump 24 is started to generate a negative pressure at the outlet of the fuel electrode 1b (and gas flow through the fuel electrode 1b), and then the supply of fuel gas is started. Therefore, the time period in which hydrogen and oxygen are unevenly distributed in the fuel electrode 1b is reduced, and deterioration is suppressed. Then, the process proceeds to S24, where a normal operation routine is performed.

If is determined that the hydrogen concentration is more than the predetermined value in S21, that is, if the result of the determination of S21 is No, it is determined that hydrogen that remains after the previous stoppage of power generation and air that enters from the oxidizer electrode 1a are unevenly distributed in the fuel chamber (state C) or that the fuel chamber is filled with hydrogen provided before the previous stoppage of power generation (state A), and the process proceeds to S23.

In S23, first, the supply of hydrogen gas is started, and then the hydrogen circulation pump 24 is started. Therefore, the uneven distribution of hydrogen and oxygen in the fuel electrode 1b, which would otherwise occur using prior art methods immediately after the hydrogen circulation pump is operated, can be avoided, and the deterioration of the fuel cell is prevented from progressing. Then, the process proceeds to S24, where the normal operation routine is performed.

The above-described embodiment provides the following effects:

(1) If it is determined that fuel electrode 1b is filled with air (state B), high-pressure hydrogen is supplied after a negative pressure is generated in the fuel electrode 1b (and gas flow resumes through the fuel electrode 1b) by operation of the hydrogen circulation pump 24. Therefore, the time period during which hydrogen and oxygen are unevenly distributed in the fuel electrode 1b is reduced, and the deterioration of the fuel cell is suppressed.

(2) If it is determined that hydrogen provided in the previous operation of power generation and air that enters from the oxidizer electrode 1a are unevenly distributed in the fuel chamber (state C) or that the fuel chamber 1b is filled with hydrogen (state A), the operation of the hydrogen circulation pump 24 is started after the supply of hydrogen gas is started. Therefore, the uneven distribution of hydrogen and oxygen in the fuel electrode 1b, which would otherwise occur using prior art methods immediately after the hydrogen circulation pump is operated, is avoided, and the deterioration of the fuel cell is prevented from progressing.

State A and state C can be divided from each other on the basis of the time elapsed after the stoppage, as described in the first embodiment. Therefore, the start time may, of course, be reduced by immediately performing the normal operation routine if it is determined that the fuel chamber is in state A.

Predetermined Value of Hydrogen Concentration

The predetermined value used for the determination performed in S21 is obtained in advance by experiment and is set to a hydrogen concentration at which the deterioration of the fuel electrode 1b does not progress even when the hydrogen circulation pump 24 is operated first in the fuel chamber.

Hydrogen Concentration Meter Location

In the hydrogen circulation pump 24, a gap between a casing and a rotor is set to be sufficiently small so as to prevent an internal leakage from an outlet to an inlet during the operation. Therefore, the hydrogen circulation pump 24 cannot be easily filled with air compared to other portions after stopping and is last to be filled with air in the hydrogen circulation system via diffusion. Thus, the hydrogen concentration meter 51 is disposed in the hydrogen circulation pump 24.

Fourth Embodiment

Figure 12:
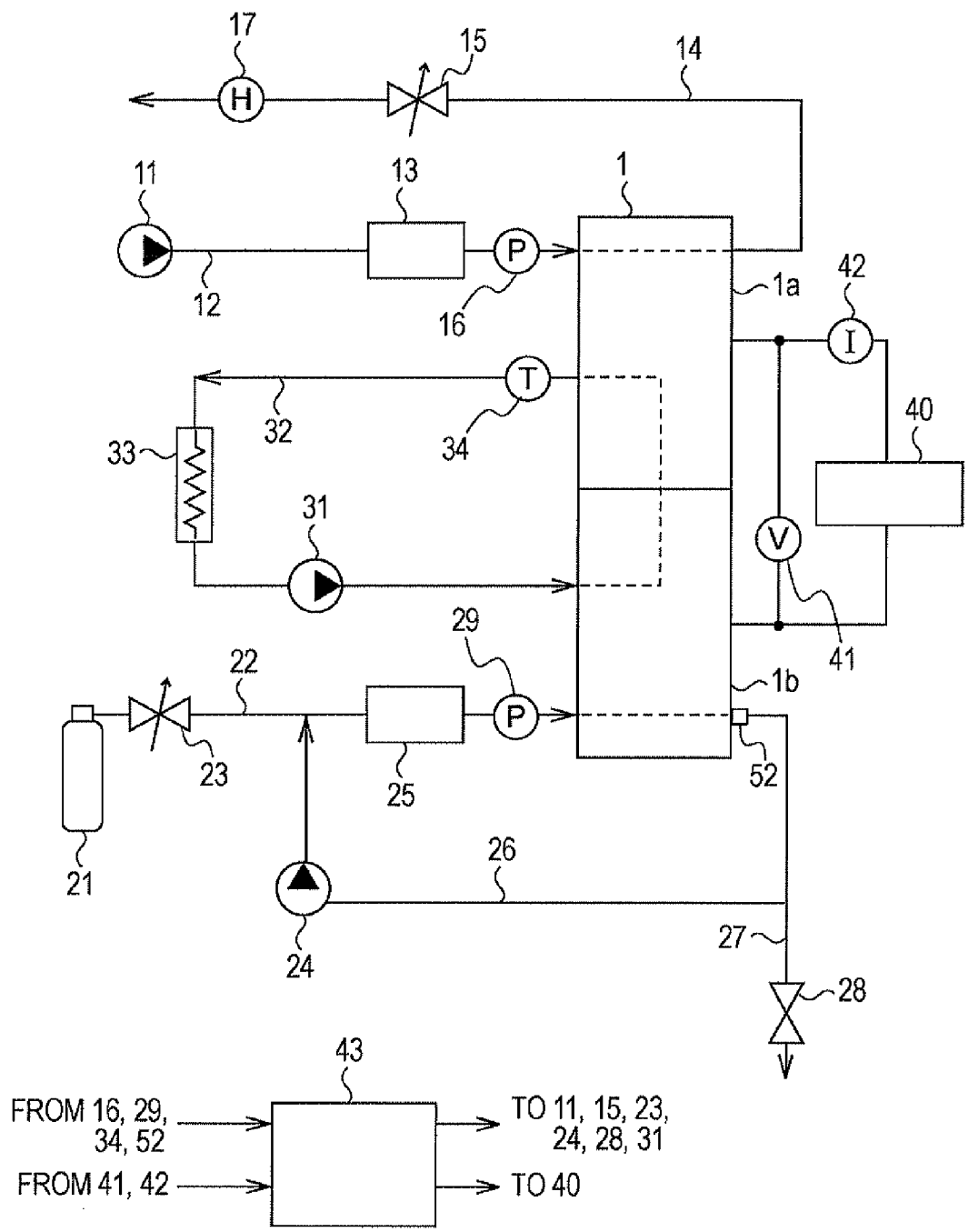
FIG. 12 is a diagram illustrating a fuel cell system according to a fourth embodiment of the present invention.

Next, a fuel cell system according to a fourth illustrated embodiment of the present invention will be described below. FIG. 12 is a system diagram showing the structure according to the fourth embodiment. The structure according to the fourth embodiment is similar to that shown in FIG. 1 except an oxygen concentration meter 52 for measuring the oxygen concentration is provided at the outlet of the fuel electrode 1b of the fuel cell body 1 as an air replacement state recognizing means.

Start Method

Figure 13:
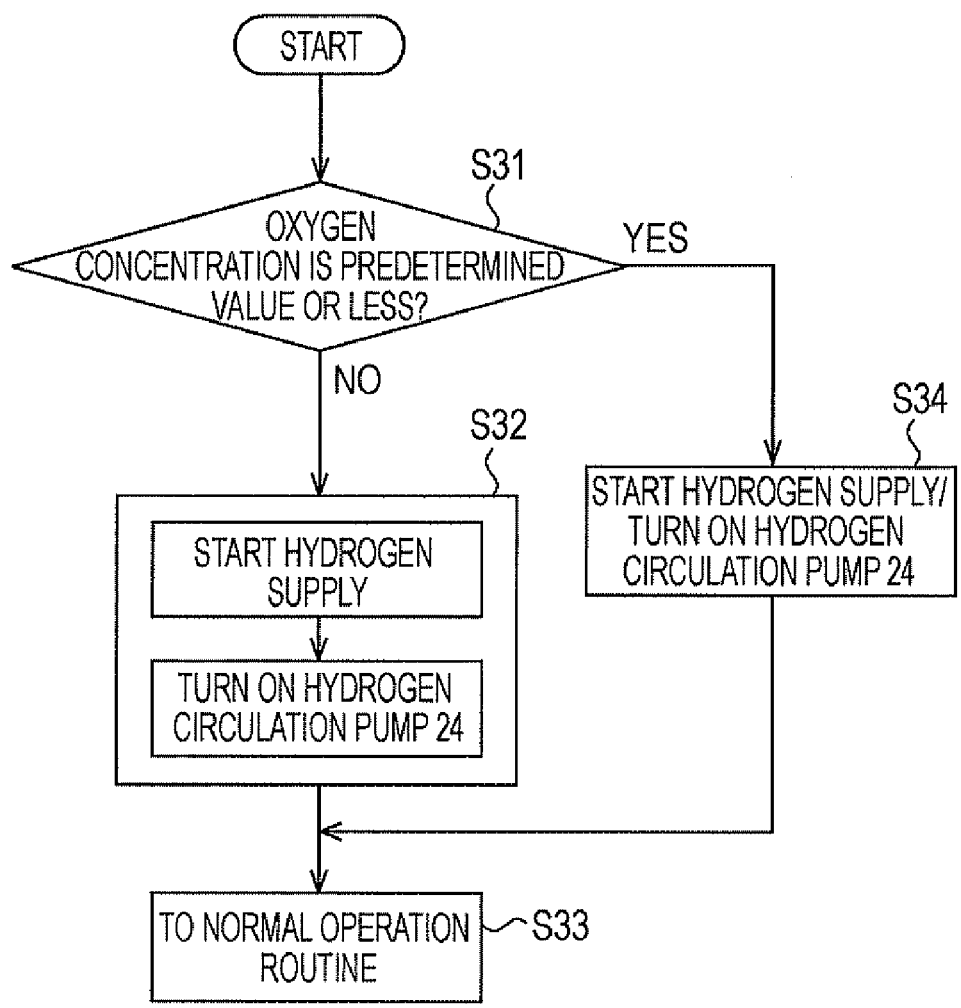
FIG. 13 is a flowchart of a process performed in the fuel cell system according to the fourth embodiment of the present invention.

A method for starting the fuel cell system according to the fourth embodiment will be described below with reference to a flowchart shown in FIG. 13. When, for example, the state of a key switch is changed from Off to On, the controller 43 detects the change and follows the step of the flowchart of FIG. 13 to start the fuel cell system.

First, in S31, a detection value of the oxygen concentration meter 52 is read and it is determined whether or not the oxygen concentration at the outlet of the fuel cell body 1 is equal to or less than a predetermined value. If it is determined that the oxygen concentration is equal to or less than the predetermined value in S31, that is, if the result of the determination of S31 is Yes, then it is determined that the fuel chamber is filled with hydrogen provided before the previous stoppage of power generation (state A). Accordingly, it is determined that hydrogen and oxygen are not unevenly distributed in the fuel electrode 1b, and the deterioration of the fuel cell will not progress. Therefore, the process proceeds to S34, where the supply of hydrogen is started and the hydrogen circulation pump 24 is activated. Here, the order in which the supply of hydrogen is started and the hydrogen circulation pump 24 is activated is not restricted. Accordingly, the supply of hydrogen may be started and the hydrogen circulation pump 24 may be activated simultaneously. Then, the process proceeds to S33, where the normal operation routine is performed.

If it is determined that the oxygen concentration is more than the predetermined value in S31, that is, if the result of the determination at S31 is No, it is determined that the fuel chamber is filled with air transmitted from the oxidizer electrode 1a during the stoppage (state B) or that hydrogen provided before the previous stoppage of power generation and air that enters from the oxidizer electrode 1a are unevenly distributed in the fuel chamber (state C), and the process proceeds to S32. In S32, first, the supply of hydrogen gas is started, and then hydrogen circulation pump 24 is started. Therefore, uneven distribution of hydrogen and oxygen can be avoided, and the deterioration of the fuel cell can be prevented from progressing. Then, the process proceeds to S33, where the normal operation routine is performed.

The above-described embodiment provides the following effects:

(1) If it is determined that the fuel electrode 1b is filled with hydrogen (state A), the normal power generating operation can be started immediately. Therefore, the start time can be reduced.

(2) If it is determined that the fuel chamber is filled with air transmitted from the oxidizer electrode 1a during the stoppage (state B) or that hydrogen provided in the previous operation of power generation and air that enters from the oxidizer electrode 1a are unevenly distributed in the fuel chamber (state C), the operation of the hydrogen circulation pump 24 is started after the supply of hydrogen gas is started. Therefore, the uneven distribution of hydrogen and oxygen in the fuel electrode 1b, which would otherwise occur using prior art methods immediately after the hydrogen circulation pump is operated, can be avoided, and the deterioration of the fuel cell can be prevented from progressing.

State B and state C can be divided from each other on the basis of the time elapsed after the stoppage, as described in the first embodiment. Therefore, the deterioration of the fuel cell can be suppressed by operating the hydrogen circulation pump 24 first when it is determined that the fuel chamber is in state B.

Predetermined Value of Oxygen Concentration

The predetermined value used for the determination performed in S31 is obtained in advance by experiment and is set to an oxygen concentration at which the deterioration of the fuel electrode 1b does not progress even when the normal operation routine is started in the fuel chamber immediately after the system is started.

Oxygen Concentration Meter Location

Since the air enters from the oxidizer electrode 1a into the fuel electrode 1b during the stoppage, the air replacement state in the fuel chamber can be detected by placing the oxygen concentration meter 52 at the outlet of the fuel cell body 1. The oxygen concentration meter 52 may, of course, be placed at the inlet of the fuel cell body 1. The outlet and the inlet of the fuel electrode 1b of the fuel cell body 1 are first to be filled with air in the hydrogen circulation system except for the inside of the fuel cell, where it is difficult to set the oxygen concentration meter 52.

Fifth Embodiment

Figure 14:
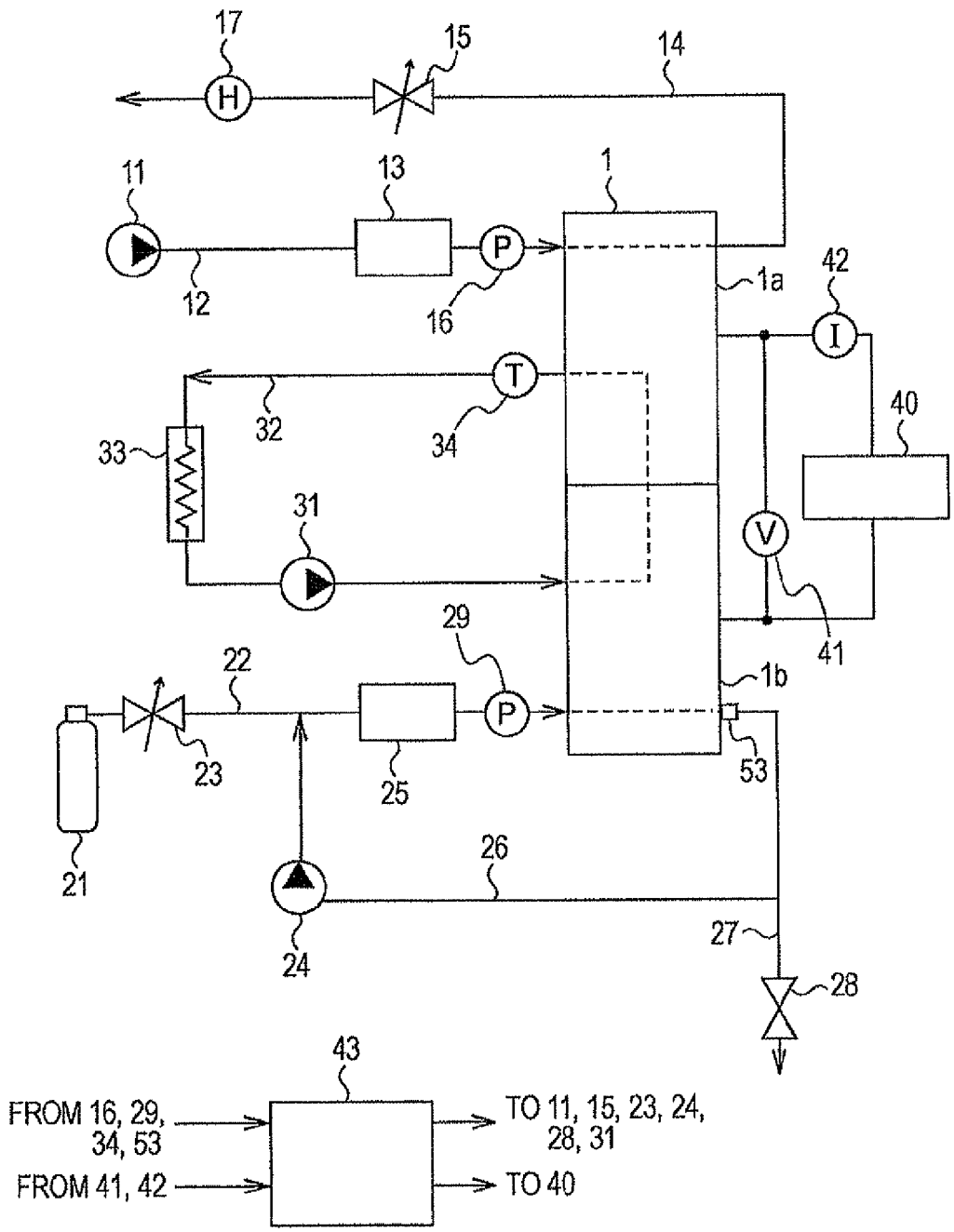
FIG. 14 is a diagram illustrating a fuel cell system according to a fifth embodiment of the present invention.

Next, a fuel cell system according to a fifth illustrated embodiment of the present invention will be described below. FIG. 14 is a system diagram showing the structure according to the fifth embodiment. The structure according to the fifth embodiment is similar to that shown in FIG. 1 except a hydrogen concentration meter 53 for measuring the hydrogen concentration is provided at an outlet of the fuel electrode 1b of the fuel cell body 1 as an air replacement state recognizing means.

Start Method

Figure 15:
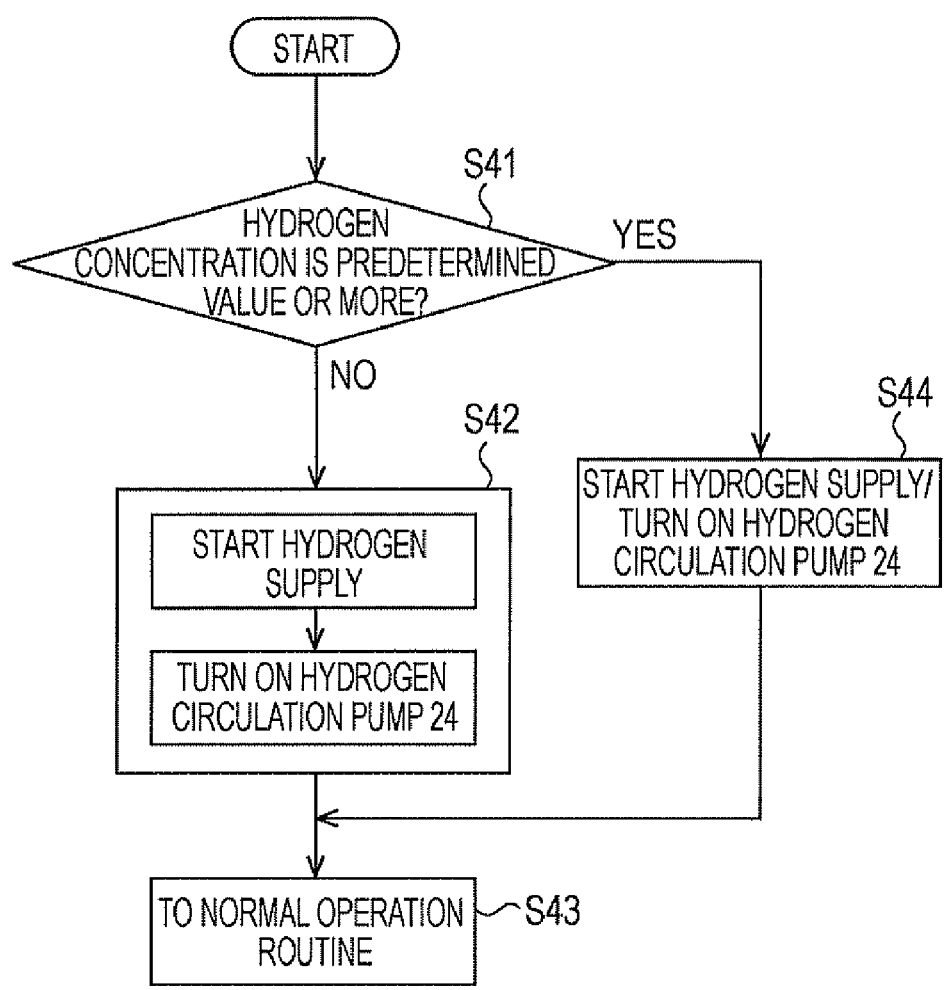
FIG. 15 is a flowchart of a process performed in the fuel cell system according to the fifth embodiment of the present invention.

Next, a method for starting the fuel cell system according to the present embodiment will be described below with reference to a flowchart shown in FIG. 15. When, for example, the state of a key switch is changed from Off to On, the controller 43 detects the change and follows the steps of the flowchart of FIG. 15 to start the fuel cell system.

First, in S41, a detection value of the hydrogen concentration meter 53 is read and it is determined whether or not the hydrogen concentration at the outlet of the fuel cell body 1 is equal to or more than a predetermined value. If it is determined that the hydrogen concentration is equal to or more than the predetermined value in S41, that is, if the result of the determination of S41 is Yes, it is determined that the fuel chamber is filled with hydrogen provided before the previous stoppage of power generation (state A). Accordingly, it is determined that hydrogen and oxygen are not unevenly distributed in the fuel electrode 1b, and the deterioration of the fuel cell does not progress. Therefore, the process proceeds to S44, where the supply of hydrogen is started and the hydrogen circulation pump 24 is activated. Here, the order in which the supply of hydrogen is started and the hydrogen circulation pump 24 is activated is not restricted. Accordingly, the supply of hydrogen may be started and the hydrogen circulation pump 24 may be activated at the same time. Then, the process proceeds to S43, where a normal operation routine is performed.

If it is determined that the hydrogen concentration is less than the predetermined value in S41, that is, if the result of the determination of S41 is No, then it is determined that the fuel chamber is filled with air that enters from the oxidizer electrode 1a during the stoppage (state B) or that hydrogen provided before the previous stoppage of power generation and air that enters from the oxidizer electrode 1a are unevenly distributed in the fuel chamber (state C), and the process proceeds to S42.

In S42, first, the supply of hydrogen gas is started, and then the operation of the hydrogen circulation pump 24 is started. Therefore, uneven distribution of hydrogen and oxygen can be avoided, and the deterioration of the fuel cell can be prevented from progressing. Then, the process proceeds to S43, where the normal operation routine is performed.

The above-described embodiment provides the following effects:

(1) If it is determined that the fuel electrode 1b is filled with hydrogen (state A), the normal power generating operation can be started immediately. Therefore, the start time can be reduced.

(2) If it is determined that the fuel chamber is filled with air transmitted from the oxidizer electrode 1a during the stoppage (state B) or that hydrogen provided in the previous operation of power generation and air that enters from the oxidizer electrode 1a are unevenly distributed in the fuel chamber (state C), the hydrogen circulation pump 24 is started after the supply of hydrogen gas is started. Therefore, the uneven distribution of hydrogen and oxygen in the fuel electrode 1b, which would otherwise occur using prior art methods immediately after the hydrogen circulation pump is operated, can be avoided, and the deterioration of the fuel cell can be prevented from progressing.

State B and state C can be divided from each other on the basis of the time elapsed after the stoppage, as described in the first embodiment. Therefore, the deterioration of the fuel cell can be suppressed by operating the hydrogen circulation pump 24 first when it is determined that the fuel chamber is in state B.

Predetermined Value of Hydrogen Concentration

The predetermined value used for the determination performed in S41 is determined in advance by experiment and is set to a hydrogen concentration at which the deterioration of the fuel electrode 1b does not progress even when the normal operation routine is started in the fuel chamber immediately after the system is started.

Hydrogen Concentration Meter Location

Since the air enters from the oxidizer electrode 1a to the fuel electrode 1b during the stoppage, the air replacement state in the fuel chamber can be detected by placing the hydrogen concentration meter 53 at the outlet of the fuel cell body 1. The hydrogen concentration meter 53 may, of course, be placed at the inlet of the fuel cell body 1. The outlet and the inlet of the fuel electrode 1b of the fuel cell body 1 are first to be filled with air in the hydrogen circulation system except for the inside of the fuel cell, where it is difficult to set the hydrogen concentration meter 53.

Sixth Embodiment

Figure 16:
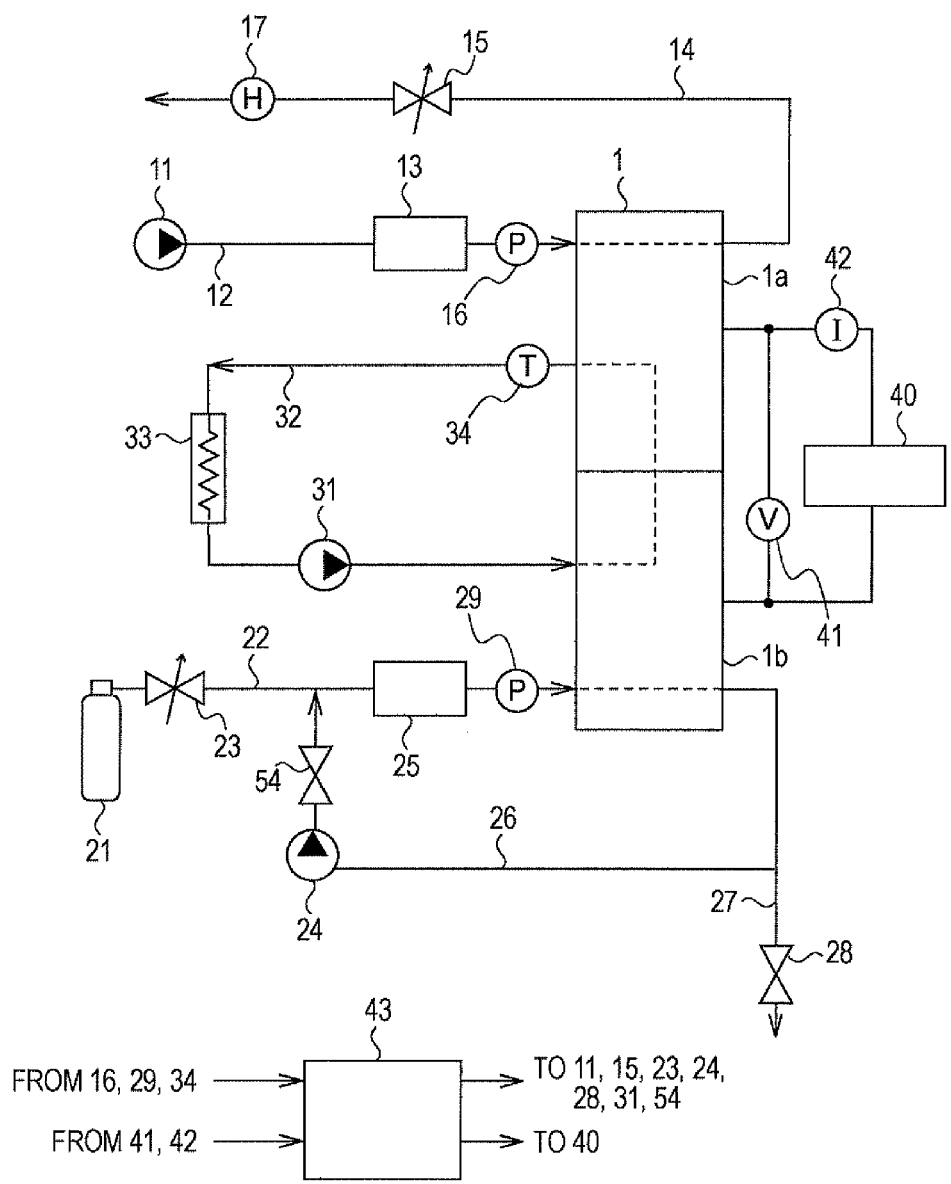
FIG. 16 is a diagram illustrating a fuel cell system according to a sixth embodiment of the present invention.

A fuel cell system according to a sixth illustrated embodiment of the present invention will be described below. FIG. 16 is a system diagram showing the structure according to the sixth embodiment. The structure according to the sixth embodiment is similar to that shown in FIG. 1 except a hydrogen-circulation-pump discharge shutoff valve 54 is provided between the outlet of the hydrogen circulation pump 24 and a junction of the hydrogen supply path 22 and the hydrogen circulation path 26.

Start Method

Figure 17:
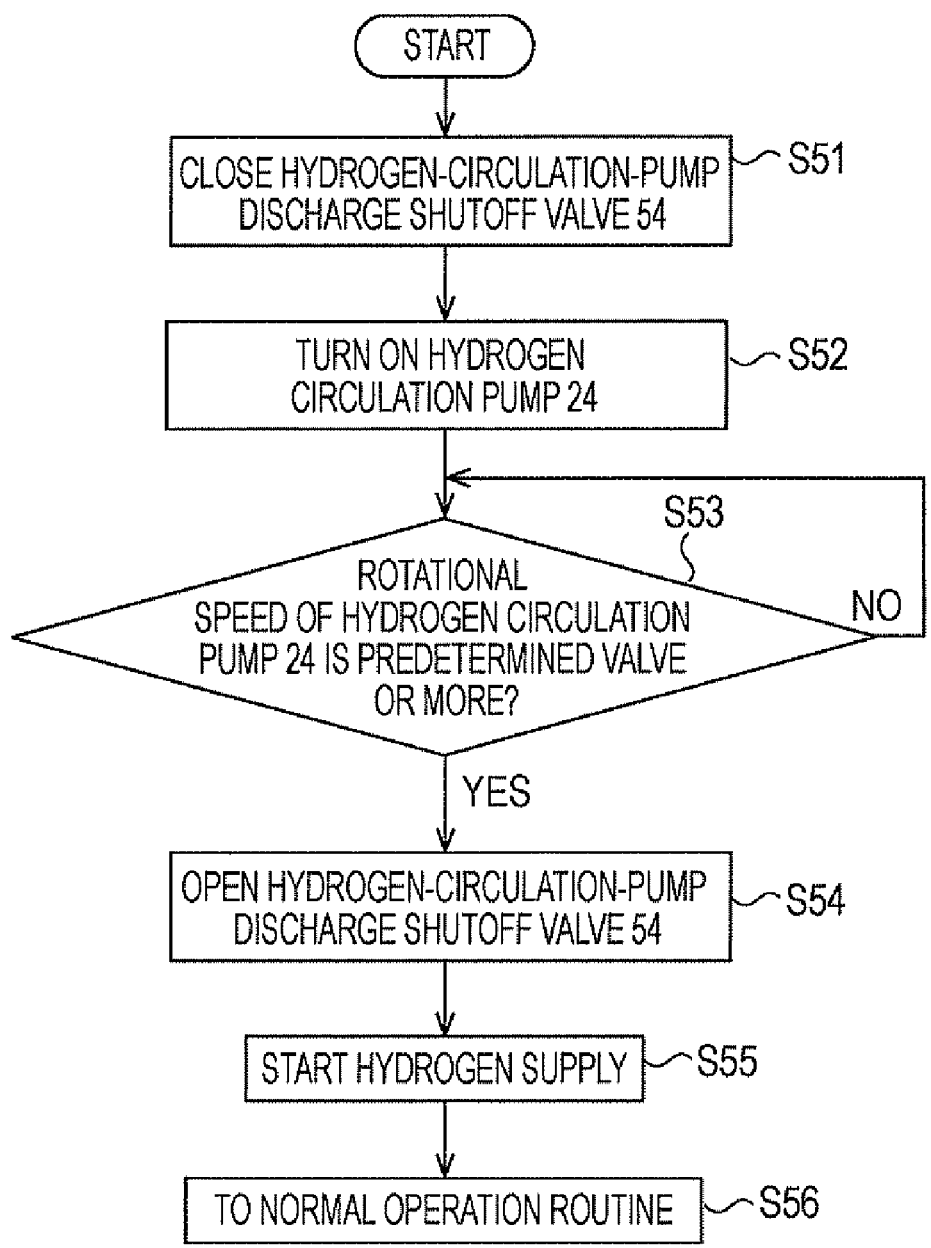
FIG. 17 is a flowchart of a process performed in the fuel cell system according to the sixth embodiment of the present invention.

Next, a method for starting the fuel cell system according to the present embodiment will be described below with reference to a flowchart shown in FIG. 17. When, for example, the state of a key switch is changed from Off to On, the controller 43 detects the change and follows the steps of the flowchart of FIG. 17 to start the fuel cell system.

First, in S51, the hydrogen-circulation-pump discharge shutoff valve 54 is closed. Then, in S52, the operation of the hydrogen circulation pump 24 is started. Then, in S53, the rotational speed of the hydrogen circulation pump 24 is detected and it is determined whether or not the rotational speed is equal to or more than a predetermined value (e.g., in revolutions per second). If it is determined that the rotational speed is equal to or less than the predetermined value in S53, that is, if the result of the determination of S53 is No, then S53 is repeated until the rotational speed reaches or exceeds the predetermined value.

If it is determined that the rotational speed is equal to or more than the predetermined value in S53, that is, if the result of the determination of S53 is Yes, then it is determined that a sufficient negative pressure is generated to cause sufficient gas flow through the fuel electrode 1b and the process proceeds to S54. The negative pressure in the fuel electrode 1b may also be determined on the basis of pressure detected by the hydrogen pressure gage 29 instead of the rotational speed of the hydrogen circulation pump 24.

In S54, the hydrogen-circulation-pump discharge shutoff valve 54 is opened, and the process proceeds to S55. In S55, the supply of hydrogen is started to eliminate the uneven distribution of hydrogen and oxygen in the fuel electrode 1b, and then the normal operation routine is performed in S56.

According to the above-described sixth illustrated embodiment, the operation of the hydrogen gas circulation pump is started after the shutoff valve 54 provided downstream of the hydrogen circulation pump 24 is closed. Therefore, if it is determined that hydrogen provided before the previous stoppage of power generation and air that enters from the oxidizer electrode 1a are unevenly distributed in the fuel chamber (state C), the uneven distribution of hydrogen and oxygen in the fuel electrode 1b, which would otherwise occur immediately after the hydrogen circulation pump 24 is activated, can be avoided, and the deterioration of the fuel cell can be prevented from progressing.

Seventh Embodiment

A fuel cell system according to a seventh embodiment of the present invention will be described below. The structure according to the seventh embodiment is similar to those shown in FIGS. 1 and 16 except oxygen concentration meters and hydrogen concentration meters similar to the oxygen concentration meters 50 and 52 and the hydrogen concentration meter 51 and 53, respectively, are provided in the hydrogen circulation pump 24 and at the outlet of the fuel cell body 1, as in the second to fourth embodiments.

Start Method

Figure 18:
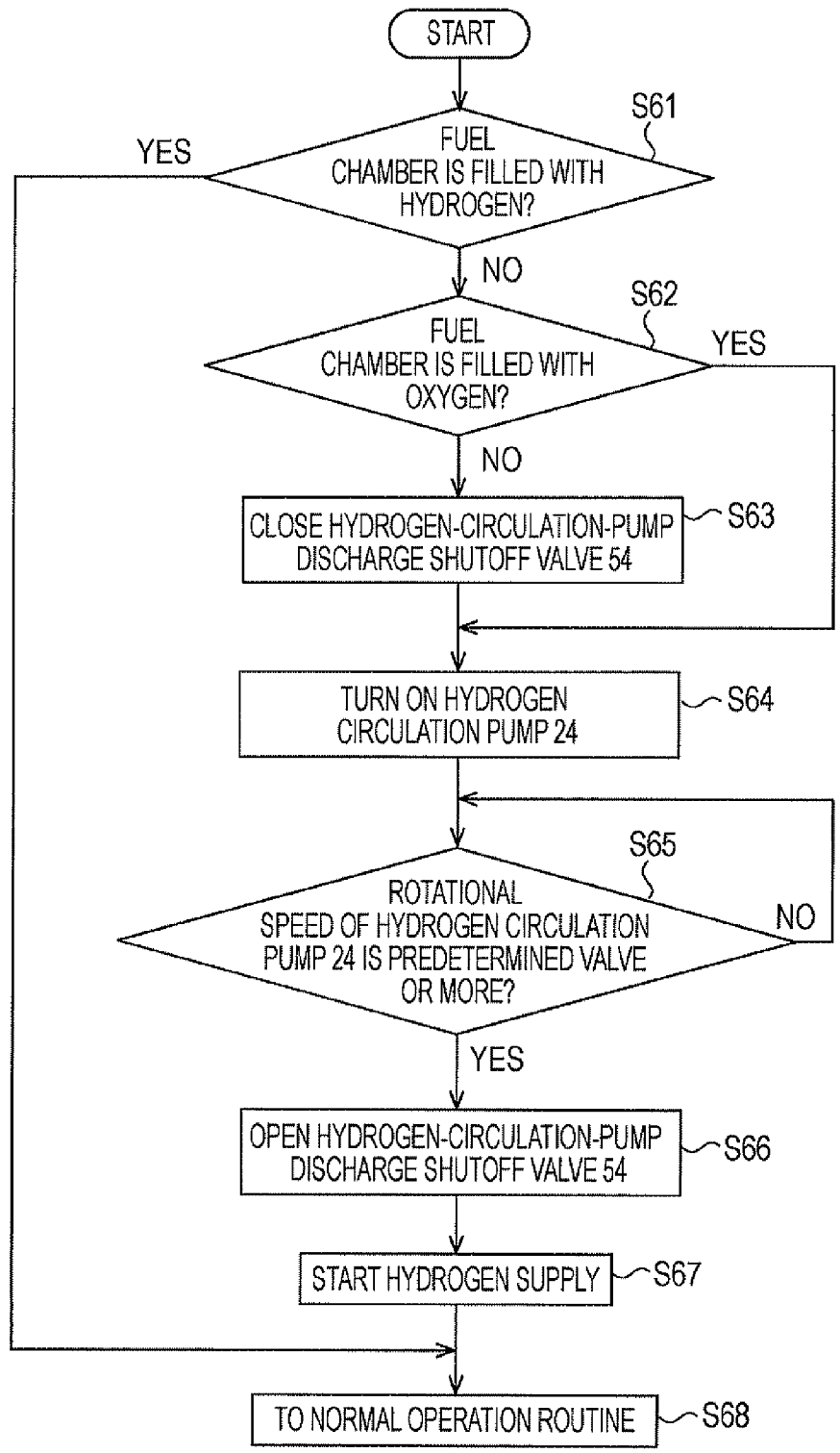
FIG. 18 is a flowchart of a process performed in a fuel cell system according to a seventh embodiment of the present invention.

A method for starting the fuel cell system according to the seventh embodiment will be described below with reference to a flowchart shown in FIG. 18. When, for example, the state of a key switch is changed from Off to On, the controller 43 detects the change and follows the steps of the flowchart of FIG. 18 to start the fuel cell system.

First, in S61, it is determined whether or not the fuel chamber is filled with hydrogen that remains after the previous stoppage of power generation. If it is determined that the fuel chamber is filled with hydrogen in S61, that is, if the result of the determination of S62 is Yes, then it is determined that the fuel chamber is filled with hydrogen that remains after the previous stoppage of power generation (state A), that hydrogen and oxygen are not unevenly distributed in the fuel electrode 1b and that the deterioration of the fuel cell will not progress. Therefore, the process proceeds to S68, and the normal operation routine is performed.

If it is determined that the fuel chamber is not filled with hydrogen in S61, that is, if the result of the determination of S61 is No, then the process proceeds to S62, where it is determined whether or not the fuel chamber is filled with air that enters from the oxidizer electrode 1a (state B). If it is determined that the fuel chamber is filled with air in S62, that is, if the result of the determination of S62 is Yes, the uneven distribution of hydrogen and oxygen will not occur in the fuel electrode 1b even in the case where the hydrogen-circulation-pump discharge shutoff valve 54 is not closed. Therefore, the routine for closing the hydrogen-circulation-pump discharge shutoff valve 54 (S63) is skipped and the routine for operating the hydrogen circulation pump 24 is performed in S64.

If it is determined that the fuel chamber is not filled with air in S62, that is, if the result of the determination of S62 is No, then it is determined that hydrogen provided in the previous operation of power generation and air that enters from the oxidizer electrode 1a are unevenly distributed in the fuel chamber (state C). Accordingly, the process proceeds to S63, where the hydrogen-circulation-pump discharge shutoff valve 54 is closed. S63 to S68 are similar to S51 to S56 according to the sixth embodiment, and explanations thereof are thus omitted.

The above-described embodiment provides the following effects:

(1) If it is determined that the fuel electrode 1b is filled with hydrogen (state A), the normal power generating operation can be started immediately. Therefore, the start time can be reduced.

(2) If it is determined that the fuel electrode 1b is filled with air (state B), the step of closing the hydrogen-circulation-pump discharge shutoff valve 54 is omitted. Therefore, the start time can be reduced.

(3) If it is determined that hydrogen provided in the previous operation of power generation and air transmitted from the oxidizer electrode 1a are unevenly distributed in the fuel chamber (state C), an effect similar to that of the sixth embodiment can be obtained.

Estimation of the Air Replacement State in the Fuel Chamber

In S61 and S62, the air replacement state in the fuel chamber is estimated on the basis of the time elapsed after the stoppage and the detection results of the oxygen concentration meters 50 and 52 and the hydrogen concentration meters 51 and 53 disposed in the hydrogen circulation pump 24 and at the outlet of the fuel cell body 1, similar to the first, second, third, fourth, and fifth embodiments.

In the above-described embodiments, the case in which the fuel cell system is stopped while the fuel electrode is in the hydrogen state and the air electrode is in the air state. However, the effects of the second to seventh embodiments may also be obtained when the fuel electrode and the air electrode are stopped in inert gas (the case in the fuel chamber is not completely filled with the inert gas and hydrogen remains in the fuel chamber).

A specific embodiment of method and apparatus for providing a fuel cell system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A fuel cell system comprising:
 a fuel cell that includes a fuel electrode and an oxidizer electrode, and an electrolyte disposed between the fuel electrode and the oxidizer electrode, the fuel cell generating electric power when fuel gas and oxidizing gas are supplied to the fuel electrode and the oxidizer electrode, respectively;
 a fuel-gas circulation path connecting an inlet of the fuel electrode to an outlet of the fuel electrode, the fuel gas supplied through the inlet and discharged from the outlet;
 a fuel-gas circulation pump on the fuel-gas circulation path;
 air replacement state recognizing means for determining a gas distribution state of the fuel electrode, wherein the gas distribution state includes a state in which hydrogen and air are unevenly distributed in at least the fuel electrode, a state in which air has displaced hydrogen in the fuel electrode, and a state in which hydrogen has not been displaced in the fuel electrode; and
 a start control device configured to select a fuel cell restart operation based on the gas distribution state determined by the air replacement state recognizing means and to operate the fuel-gas circulation pump and a supply of the fuel gas based on the fuel cell restart operation selected.

2. The fuel cell system according to claim 1, wherein the air replacement state recognizing means includes a timer configured to measure a time that elapses between stoppage of the fuel cell and restarting of the fuel cell and to determine the state in which hydrogen and air are unevenly distributed in at least the fuel electrode when the elapsed time is more than a first predetermined time and less than a second predetermined time.

3. The fuel cell system according to claim 2, further comprising a thermometer that estimates or detects a temperature in the fuel cell, wherein the first and second predetermined times are corrected such that the first and second predetermined times are reduced as the temperature is increased.

4. The fuel cell system according to claim 2, wherein when the elapsed time is greater than or equal to the second predetermined time, the air replacement state recognizing means determines the state in which air has displaced hydrogen in the fuel electrode and the start control device selects the fuel cell restart operation in which supply of the fuel gas is started after the operation of the fuel-gas circulation pump is started.

5. The fuel cell system according to claim 2, wherein if the elapsed time is equal to or less than the first predetermined time, the air replacement state recognizing means determines the state in which hydrogen has not been displaced in the fuel electrode.

6. The fuel cell system according to claim 1, wherein the air replacement state recognizing means includes an oxygen concentration sensor that detects an oxygen concentration at a point in the fuel-gas circulation path after the fuel cell stops, and wherein the air replacement state recognizing means determines the state in which air has displaced hydrogen in the fuel electrode if the oxygen concentration is equal to or more than a predetermined value.

7. The fuel cell system according to claim 1, wherein the air replacement state recognizing means includes a fuel-gas concentration sensor that detects a fuel-gas concentration, at a point in the fuel-gas circulation path after the fuel cell stops, and wherein the air replacement state recognizing means determines the state in which air has displaced hydrogen in the fuel electrode if the fuel-gas concentration is equal to or less than a predetermined value.

8. The fuel cell system according to claim 1, wherein the air replacement state recognizing means includes an oxygen concentration sensor that detects an oxygen concentration, at a point in the fuel-gas circulation path after the fuel cell stops, and wherein the air replacement state recognizing means determines the state in which hydrogen has not been displaced in the fuel electrode if the oxygen concentration is equal to or less than a predetermined value.

9. The fuel cell system according to claim 1, wherein the air replacement state recognizing means includes a fuel-gas concentration sensor that detects a fuel-gas concentration, at a point in the fuel-gas circulation path after the fuel cell stops, and wherein the air replacement state recognizing means determines the state in which hydrogen has not been displaced in the fuel electrode if the fuel-gas concentration is equal to or more than a predetermined value.

10. The fuel cell system according to claim 1, further comprising a shutoff valve disposed between an outlet of the fuel-gas circulation pump and an inlet of a fuel cell body, wherein, if the air replacement state recognizing means determines the state in which hydrogen and air are unevenly distributed in at least the fuel electrode or the state in which air has displaced hydrogen in the fuel electrode, the start control device is configured to start operation of the fuel-gas circulation pump after the shutoff valve is closed, and to then open the shutoff valve and start supply of the fuel gas when a rotational speed of the fuel-gas circulation pump becomes equal to or more than a predetermined value or when an inner pressure of the fuel electrode becomes equal to or less than a predetermined value.

11. The fuel cell system according to claim 1, wherein when the air replacement state recognizing means determines the state in which hydrogen and air are unevenly distributed in at least the fuel electrode, the start control device is configured to supply the fuel gas before the fuel-gas circulation pump is started.

12. The fuel cell system according to claim 1, wherein when the air replacement state recognizing means determines the state in which air has displaced hydrogen in the fuel electrode, the start control device selects the fuel cell restart operation in which supply of the fuel gas is started after the operation of the fuel gas circulation pump is started.

13. The fuel cell system according to claim 1, wherein when the air replacement state recognizing means determines the state in which air has not been displaced in the fuel electrode, the start control device selects the fuel cell restart operation in which supply of the fuel gas is started irrespective of operation of the fuel gas circulation pump.

14. A method of controlling a fuel cell system including a fuel cell that includes a fuel electrode, an oxidizer electrode and an electrolyte disposed between the fuel electrode and the oxidizer electrode, the fuel cell generating electric power when fuel gas and oxidizing gas are supplied to the fuel electrode and the oxidizer electrode, respectively, a fuel-gas circulation path that connects an inlet of the fuel electrode to an outlet of the fuel electrode, the fuel gas being supplied through the inlet and discharged from the outlet, and a fuel-gas circulation pump provided on the fuel-gas circulation path, the method comprising:
 determining a gas distribution state of the fuel electrode, wherein the gas distribution state includes a state in which hydrogen and air are unevenly distributed in at least the fuel electrode, a state in which air has displaced hydrogen in the fuel electrode, and a state in which hydrogen has not been displaced in the fuel electrode; and
 selecting a fuel cell restart operation based on the gas distribution state, the fuel cell restart operation comprises operating the fuel-gas circulation pump and a supply of the fuel gas.

15. The method of claim 14 wherein determining the gas distribution state comprises measuring a time between a previous stoppage of the fuel cell and a restart of the fuel cell, wherein the state in which hydrogen and air are unevenly distributed in at least the fuel electrode is determined when the measured time is greater than a first predetermined time but less than a second predetermined time, and wherein selecting the fuel cell restart operation further includes activating the fuel gas supply before the fuel gas circulation pump is started.

16. The method of claim 15, wherein when the measured time is equal to or greater than the second predetermined time, the state in which air has displaced hydrogen in the fuel electrode is determined and selecting the fuel cell restart operation further includes activating the fuel gas circulation pump before the fuel gas supply is started.

17. The method of claim 14 wherein determining the gas distribution state comprises measuring an oxygen level within the fuel-gas circulation pump and the state in which hydrogen and air are unevenly distributed in at least the fuel electrode hydrogen is determined if the oxygen concentration is greater than or equal to a predetermined value, and wherein selecting the fuel cell restart operation further includes activating the fuel-gas circulation pump before the fuel gas supply is started.

18. The method of claim 17, wherein the state in which hydrogen has not been displaced in the fuel electrode is determined when the measured level is less than the predetermined oxygen level.

19. The method of claim 14 wherein determining the gas distribution state further comprises measuring a hydrogen level within the fuel-gas circulation pump, wherein the state in which hydrogen and air are unevenly distributed in at least the fuel electrode hydrogen is determined when the measured level is equal to or less than a first predetermined hydrogen level and selecting the fuel cell restart operation further includes activating the fuel gas circulation pump before the fuel gas supply is started.

20. The method of claim 19, wherein the state in which hydrogen has not been displaced in the fuel electrode is determined when the measured level is greater than the predetermined hydrogen level.

21. The method of claim 14 wherein determining the gas distribution state comprises measuring an oxygen level proximate an outlet of the fuel electrode and the state in which hydrogen and air are unevenly distributed in at least the fuel electrode hydrogen is determined if the oxygen concentration is greater than or equal to a predetermined value, and wherein selecting the fuel cell restart operation further includes activating the fuel gas supply-before the fuel-gas circulation pump is started.

22. The method of claim 21, wherein the state in which hydrogen has not been displaced in the fuel electrode is determined when the measured level is less than the predetermined oxygen level.

23. The method of claim 14 wherein determining the gas distribution state further comprises measuring a hydrogen level proximate an outlet of the fuel electrode: and the state in which hydrogen and air are unevenly distributed in at least the fuel electrode hydrogen is determined if the oxygen concentration is greater than or equal to a predetermined value, and wherein selecting the fuel cell restart operation further includes activating the fuel gas supply before the fuel-gas circulation pump is started.

24. The method of claim 23, wherein the state in which hydrogen has not been displaced in the fuel electrode is determined when the measured level is greater than the predetermined hydrogen level.

25. The method of claim 14 wherein the fuel cell system further includes a shut-off valve that blocks on outlet of the fuel-gas circulation pump disposed in the fuel-gas circulation path, wherein if the state in which hydrogen and air are unevenly distributed in at least the fuel electrode or the state in which air has displaced hydrogen in the fuel electrode is determined, the method further comprises:
 activating the fuel-gas circulation pump;
 measuring a rotational speed of the fuel-gas circulation pump; and
 opening the shut-off valve and activating the fuel gas supply when the measured speed is equal to or more than a predetermined speed.

26. A fuel cell system comprising:

a fuel cell that includes a fuel electrode, an oxidizer electrode and an electrolyte disposed between the fuel electrode and the oxidizer electrode, the fuel cell generating electric power when fuel gas and oxidizing gas are supplied to the fuel electrode and the oxidizer electrode, respectively;

a fuel-gas circulation path connecting an inlet of the fuel electrode to an outlet of the fuel electrode, the fuel gas supplied through the inlet and discharged from the outlet;

a fuel-gas circulation pump on the fuel-gas circulation path;

a valve between an outlet of the fuel-gas circulation pump and an inlet of the fuel electrode;

air replacement state recognizing means configured to determine if hydrogen and air are unevenly distributed in at least the fuel electrode prior to restarting of the fuel cell; and a controller configured to close the valve when the fuel cell system is started and to open the valve when the fuel-gas circulation pump reaches a predetermined speed if the air replacement state recognizing means determines that hydrogen and air are unevenly distributed in at least the fuel electrode.

* * * * *